United States Patent [19]
Bloomberg

[11] Patent Number: 5,828,771
[45] Date of Patent: Oct. 27, 1998

[54] METHOD AND ARTICLE OF MANUFACTURE FOR DETERMINING WHETHER A SCANNED IMAGE IS AN ORIGINAL IMAGE OR FAX IMAGE

[75] Inventor: Dan S. Bloomberg, Palo Alto, Calif.

[73] Assignee: Xerox Corporation, Stamford, Conn.

[21] Appl. No.: 573,617

[22] Filed: Dec. 15, 1995

[51] Int. Cl.$^6$ ........................................... G06K 9/00
[52] U.S. Cl. ............................................ 382/112; 382/199
[58] Field of Search .................................. 382/170, 199,
382/206, 161, 112, 200; 395/110, 150,
142; 358/522, 523, 467

[56] References Cited

U.S. PATENT DOCUMENTS

| | | | |
|---|---|---|---|
| 4,561,106 | 12/1985 | Yoshida et al. | 382/203 |
| 5,142,592 | 8/1992 | Moler | 382/200 |
| 5,181,258 | 1/1993 | Nagao et al. | 382/206 |
| 5,272,766 | 12/1993 | Higgins et al. | 382/161 |
| 5,278,918 | 1/1994 | Bernzott et al. | 382/176 |
| 5,416,851 | 5/1995 | Huttenlocher et al. | 382/196 |
| 5,416,898 | 5/1995 | Opstad | 395/150 |
| 5,489,920 | 2/1996 | Kaasila | 345/136 |
| 5,513,277 | 4/1996 | Huttenlocher | 382/171 |
| 5,594,809 | 1/1997 | Kopec et al. | 382/161 |

OTHER PUBLICATIONS

Dan S. Bloomberg, Multiresolution Morphological Analysis of Document Images, *SPIE Conf. 1818, Visual Communications and Image Processing '92*, Boston, MA, Nov. 1992, pp. 648–662.

E. Dougherty and C. Giardina, *Matrix Structured Image Processing*, Prentice–Hall, 1987, Chapter 4, pp. 98–130.

J. C. Handley and E. R. Dougherty, "Optimal nonlinear fax restoration", *SPIE vol. 2181 Document Recognition* (1994), pp. 232–242.

Greg Ricker and Adam Winkler, "Recognition of faxed Documents", *SPIE vol. 2181 Document Recognition* (1994), pp. 371–377.

"Can OCR Ever Work for Fax?", *Imaging Technology Report*, May 8, 1995, pp. 5–6.

D. S. Bloomberg, "Image analysis using threshold reduction," *SPIE Conf. 1568, Image Algebra and Morphological Image Processing II*, San Diego, CA, Jul. 1991, pp. 38–51.

*Primary Examiner*—Joseph Mancuso
*Assistant Examiner*—Jayanti K. Patel
*Attorney, Agent, or Firm*—Judith C. Bares

[57] ABSTRACT

An efficient image processing technique automatically analyzes an image scanned at 300 or greater dpi and measures an image characteristic of the input image from which it is possible to determine whether the image has ever been previously scanned or printed at low resolution at some time in its history. The technique is effective in classifying an image that was at one time embodied in paper form and scanned at a vertical resolution of 100 dpi or less, such as a facsimile document scanned in standard mode, or at 200 pixels/inch (referred to as "fine fax mode".) The technique performs measurements on the pixels included in the vertical or horizontal edges of symbols contained in the input image, and produces a distribution of the measurements. A numerical interpretation of the measurement distribution data is used to classify the image. The invention is computationally efficient because it may be applied to only a small percentage (e.g., 7%) of a document image as long as the subimage selected contains symbols such as characters. The invention may be incorporated into a document image management system where identification of documents that contain the artifacts of low resolution document images could be used to improve subsequent processing of the image, such as, for example, in an OCR system.

20 Claims, 13 Drawing Sheets

Histogram of heights of 8-connected vertical edge components, from an original image scanned at 400 dpi.

Histogram of heights of 8-connected vertical edge components, from a standard fax image re-scanned at 400 dpi.

*Pattern spectrum of vertical edge runs from an original.*

*Pattern spectrum of vertical edge runs from a fax.*

Scores for 26 pairs of original and standard fax images, computing statistics using selected subimages Scores for 26 pairs of original and standard fax images, computing statistics using the entire images Histogram of heights of 8-connected vertical edge
components, from a fine fax image re-scanned at 400 dpi Scores for 20 pairs of original and fine fax images,
using selected subimages produced by tiling with N=3

METHOD AND ARTICLE OF MANUFACTURE FOR DETERMINING WHETHER A SCANNED IMAGE IS AN ORIGINAL IMAGE OR FAX IMAGE

BACKGROUND OF THE INVENTION

The present invention relates generally to processor-based techniques for analyzing the characteristics of an image, and more particularly to techniques for automatically determining whether a scanned image of primarily textual and graphical symbols has the characteristic of having either been printed at low resolution, or scanned at low resolution when in the form of a paper document, at some time previous to its most recent scanning.

At some point in its life cycle a document containing primarily textual and graphical symbols may be scanned or printed at low resolution to produce a document image. For example, the facsimile (fax) transmission of such a document in hard copy form requires that the hard copy be scanned at resolutions of approximately 200×100 dots per inch (dpi) for standard resolution fax images or approximately 200×200 dpi for fine resolution fax images. The low resolution image thus produced is then typically rendered onto a paper medium again by the recipient. A fax image having one of these resolutions may also be generated electronically, without initial generation of paper, and then rendered onto a hard copy medium such as paper.

Document images originally printed at high resolutions of 400 dpi and greater suffer significant degradation when subsequently scanned at low resolution: images of characters and graphical symbols are distorted because pixels are made larger in the low resolution image. In addition, pixels may be dropped or added, resulting in images that are often blurred, faded, merged or broken apart. When document images that have been previously printed or scanned at low resolution at some time in their history are scanned for input into a document image management system, typically at 300 dpi or 400 dpi resolution, the resulting image that is input to the system carries the artifacts of this prior low resolution scanning. The processing that the document image subsequently undergoes after low resolution scanning may be adversely affected by these artifacts. For example, when such a document is input to an optical character recognition (OCR) process, the accuracy of the recognition process is often severely impaired because some of the individual symbolic (e.g., character) images are too poorly formed to be properly classified.

Document management and OCR systems may introduce processes for compensating for expected image degradation in images that have been previously scanned at low resolution. OCR systems, for example, typically provide a setting that a user selects to communicate to the recognition software that the document image to be recognized is a facsimile image. This approach works when the user knows that the image is a facsimile document, but the history of some documents may not be readily known. A more significant limitation of this approach in general is the requirement of user involvement. It would be preferable for the recognition system itself to be able to determine from the scanned input document image alone whether the document image contains the artifacts of an image previously printed or scanned at low resolution, provided that such a method is computationally efficient and highly accurate.

SUMMARY OF THE INVENTION

The present invention makes an assessment as to whether an input image has ever been scanned at low resolution previously in its life cycle. The input image is provided to the invention by the high resolution (e.g., 300 or greater dpi.) scanning of a hard copy medium with the input image rendered thereon.

The present invention is based on the observation that certain parts of the symbolic images contained in documents printed or scanned at low resolution contain patterns of pixel arrangements in statistically significant numbers that are imposed in the image as a result of a prior low-resolution scanning process. These pixel distributions are characteristic of this type of image, and are not found in images that have never been scanned at low resolution in their history. For example, thinning and thickening of character images is introduced in text documents when scanned or printed at low resolution, and there is a tendency for the curvilinear portions of symbols in images scanned or printed at low resolution to appear less smoothly curved and therefore squarer in appearance (i.e., more nearly vertical and horizontal boundaries) than in an original, high resolution document.

The present invention is premised on the discovery that a measurement of the image made in relation to the curvilinear image edge locations in the image is an appropriate image characteristic, provided that the measurement produces data that may be used to accurately discriminate between images that have smooth curvilinear image edge locations and images that have more rectangular curvilinear image edge locations. One such image characteristic is the distribution of the image locations that indicate curvilinear image edge locations of the symbols or graphical objects in the image; various types of measurements of this distribution, such as the sizes of the curvilinear image edge locations, may produce data that may be used to accurately classify an input image as one that has or has not been printed or scanned at low resolution at some prior point in its document history.

For convenience and brevity of usage in this discussion, a document or document image that has been printed or scanned at low resolution at some time in its life cycle will also be referred to as a "fax document", and a text document that has never been printed or scanned at low resolution in its history will also be referred to hereafter as an "original document." It is understood, however, that, in addition to document images created by facsimile transmission, the invention is intended to apply to any printed or scanned image that has been a low resolution document at some time in its document history. It is further understood that this terminology does not preclude other types of image transformations, for example, light lens or digital copies, from also being included in a document's life cycle.

It is important to note that the present invention is not simply a technique to compare two document images of the same content to determine which image is the fax document (i.e., the one that has been previously printed or scanned at low resolution.) The problem solved here is to make the determination when only one document is available for analysis. The problem solved by the present invention, therefore, is the problem of performing an image classification such that, if an image of either type is presented to the classification method, the method accurately states whether the document is an original or a fax document.

The invention uses an effective type of pixel pattern isolation operation that accurately extracts image edge locations of an input image. The image characteristic related to the curvilinear edge portions of symbols in the input image may then be measured in any manner that produces data indicating a distribution of the curvilinear edge portions in the image. This distribution is then statistically analyzed and interpreted to produce the image classification. Two analysis methods with accompanying statistical interpretations are described in the detailed description below. Both methods accurately identify documents previously printed or scanned at low resolution, although one method appears to provide a more reliable statistical discrimination.

In accordance with the present invention, there is provided an image processing method, implemented in a machine having a processor, for operating on image data defining an image including a first plurality of image locations. The image has an image characteristic capable of being measured in relation to image locations occurring at image edges. The method classifies an image on the basis of a measurement of the image characteristic for the image. In carrying out the method, the processor of the machine executes instructions that causes the processor to produce a second plurality of image locations, referred to as image edge locations, indicating the image edge locations occurring in the first plurality of image locations at one of vertical or horizontal edges included in the image. The image edge locations include image locations indicating expected curvilinear image edge locations of glyphs and graphical objects included in the image. Then, a measurement operation is performed using the image to measure an image characteristic of the image in relation to the image edge locations; the image characteristic is a measurable attribute of the image. The measurement operation produces image characteristic measurement data that includes measurements of the image characteristic related to the image edge locations indicating the expected curvilinear image edge locations of glyphs and graphical objects included in the image. Distribution data is then produced that indicates a distribution of the image characteristic measurement data. The image is then classified as being in one of two categories on the basis of interpretation data indicating a numerical interpretation of the distribution data. The interpretation data provides a statistical interpretation of the extent of curvature of the expected curvilinear image edge locations of glyphs and graphical objects included in the image.

In another aspect of the present invention, the image processing method for classifying an image including a first plurality of image locations includes the steps of determining a second plurality of image locations, referred to as image edge locations, indicating the image edge locations occurring in the first plurality of image locations at one of vertical or horizontal edges included in the image; determining a third plurality of image locations indicating image edge connected components included in the image edge locations; determining sizes of each of the image edge connected components using the third plurality of image locations; producing a data array, referred to as histogram data, indicating the frequency of occurrence of the plurality of image edge connected components as a function of their size; producing a numerical score using the histogram data; and classifying the image on the basis of the numerical score.

The illustrated embodiments of the present invention do not rely on techniques that require the segmentation of character images or the identification of character fonts, both of which may be computationally expensive and error-prone. The illustrated embodiments also do not involve the construction of complex or special data structures. The image-based operations used to analyze the input scanned document image include a standard set of morphological operations that are straightforward to implement. Because the methodology is based on a clear understanding of how the artifacts of scanning at low resolution are manifested in the pixel arrangements, the invention provides an elegantly simple yet accurate solution to the problem of identifying whether an input scanned document image has ever been previously printed or scanned at low resolution.

Experimental results show that the image classification technique is computationally fast and efficient, and that consistently accurate results can be achieved using only a small portion of an input image that may be automatically selected as part of the technique.

Another advantage of the illustrated embodiments of the invention is that the image-based operations on the pixels in the input image produce the internal signal transformations and data structures necessary to perform the image classification without permanently altering the input image in any way. Because the image classification technique may operate entirely automatically without intervention or input from a machine user, the user need not see or know the results of the classification, unless a subsequent operation using the input image data structure requires the user to take some action on the basis of the image classification. The input image may thus be subsequently used by a document management system, such as an OCR system.

The novel features that are considered characteristic of the present invention are particularly and specifically set forth in the appended claims. The invention itself, however, both as to its organization and method of operation, together with its advantages, will best be understood from the following description of the illustrated embodiments when read in connection with the accompanying drawings. In the Figures, the same numbers have been used to denote the same component parts and steps.

DETAILED DESCRIPTION OF THE ILLUSTRATED EMBODIMENTS

Figure 1:
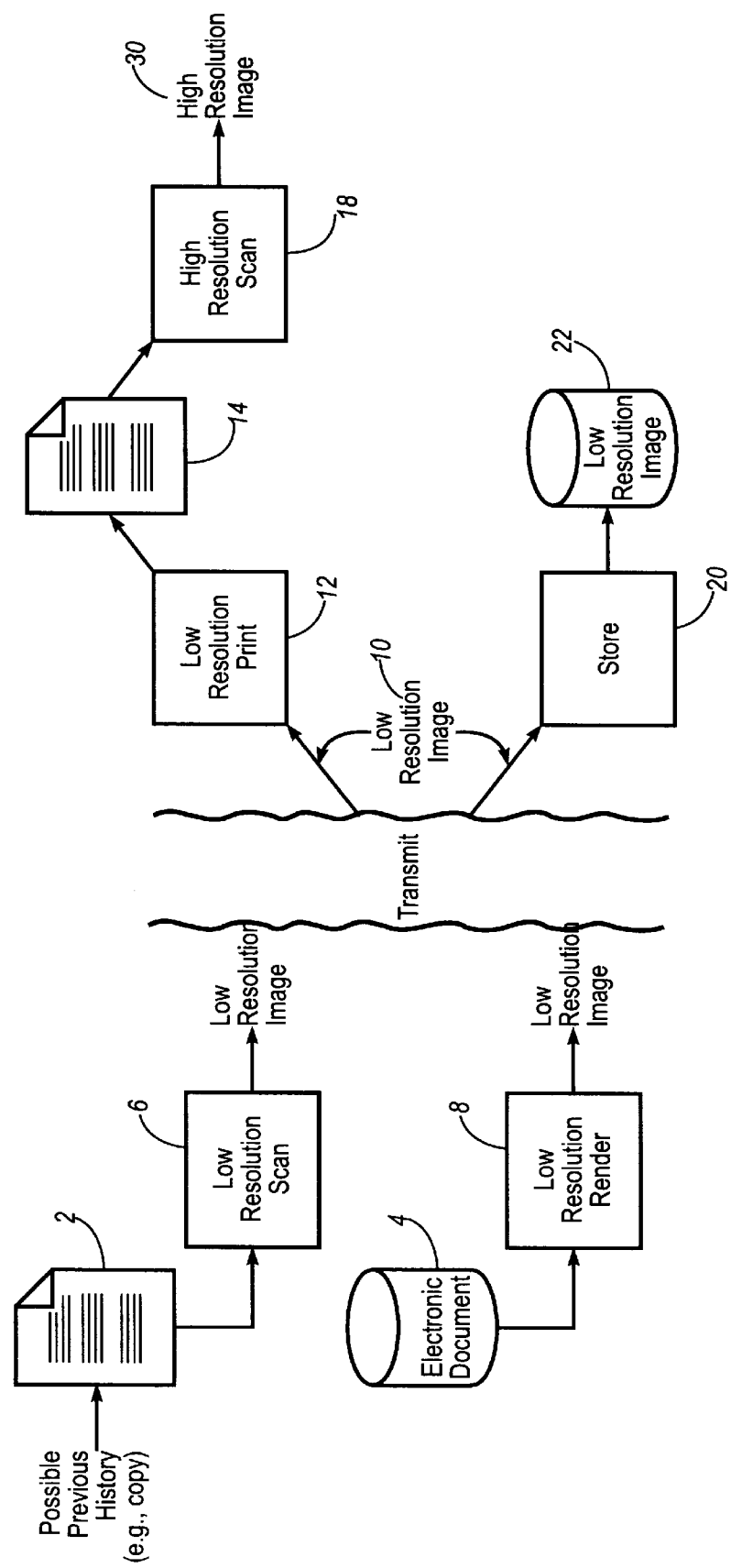
FIG. 1 is a block diagram illustrating examples of document life cycles, including a typical document life cycle of a document of the type the present invention is designed to classify.

The detailed description below is organized as follows: Section A provides a conceptual framework for understanding the invention and the terminology used to describe the invention. Section B describes the general features of the present invention. Section C provides procedural descriptions of two embodiments of the present invention. Section D provides a description of the machine environment of the present invention and a description of the invention implemented as a software product. Section E concludes the description of the invention with a description of experimental data, as well as additional and miscellaneous features of the invention.

A. Conceptual Framework

The present invention relates to operating a machine or system including a processor, and to processing electrical or other physical signals to produce other desired physical signals. The detailed descriptions which follow are presented largely in terms of symbolic representations of operations of data within the memory of the system. These operations require physical manipulations of physical quantities such as electrical or magnetic signals that are capable of being stored, transferred, combined, compared, and otherwise manipulated. For convenience, these physical signals will be referred to herein variously as bits, values, image locations, pixels, characters or glyphs. Further, the operations performed on the signals, referred to in terms such as adding, comparing, or determining, while commonly associated with mental operations performed by a human user, are performed exclusively by a processor of a suitable machine, and require no human capability, apart from supplying, when appropriate, the initial input document from which scanned input image signals were derived. In addition, the algorithmic descriptions of the invention that are presented herein for operating the system are not inherently related to any particular processor, machine, or other apparatus. The machine or system may be specially constructed for the required purposes or it may comprise a general purpose computer selectively activated or reconfigured by a computer program stored in the computer. Useful machines for performing the operations of the present invention include general purpose digital computers or other similar devices configured as described below and in the claims.

The following terms provide the framework for describing the embodiments of the claimed invention illustrated in the accompanying drawings. These terms have the meanings indicated below throughout this specification and in the claims, rather than any meanings that may occur in other sources, such as, for example, documents, if any, that are incorporated by reference herein elsewhere in this description.

The term "data" or "data item" refers herein to physical signals that indicate or include information. "Data" includes data existing in any physical form, and includes data that is transitory or is being stored or transmitted. For example, data could exist as an electromagnetic or other transmitted signal or as a signal stored in electronic, magnetic, or other form. Data items can be combined into a "data structure" such that the data structure "includes" the combined data items; thus, a "data structure" is any combination of inter-related data. A data structure may also include other data structures. An item of data "indicates" a thing, an event, or a characteristic when the item has a value that depends on the existence or occurrence of the thing, event, or characteristic or on a measure of the thing, event, or characteristic. When an item of data can indicate one of a number of possible alternatives, the item of data has one of a number of "values". For example, when an image location in a binary image indicates the color of the image location as being either a "0" or a "1", the image location has a value of "0" or "1". A first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data. For example, in a histogram data structure that includes a first data item indicating a specific size of a run of vertically oriented image locations in an image and a second data item indicating the frequency of occurrence of that specific size of vertically oriented image locations, the size data item indicates the frequency data item.

An "array of data" or "data array" or "array" is a combination of items of data that can be mapped into an array. A "two-dimensional array" is a data array whose items of data can be mapped into an array having two dimensions. Data "defines" an array when it includes data sufficient to obtain or produce the array. For example, data defining an array may include the defined array itself, a compressed or encoded form of the defined array, a pointer to the defined array, a pointer to a part of another array from which the defined array can be obtained, or pointers to a set of smaller arrays from which the defined array can be obtained.

A "processor" is any machine, component or system that can process data, and may include one or more central processing units or other processing components. Any two components of a machine or system are "connected" when there is a combination of circuitry that can transfer data from one of the components to the other. A processor "uses" data in performing an operation when the result of the operation depends on the value of the data. An "instruction" is an item of data that a processor can use to determine its own operation. A processor executes a set of instructions when it uses the instructions to determine its operation, and an "operation" results from the processor executing the set of instructions. Thus, a set of instructions may be considered to be an operation. A processor performs an operation or a function "automatically" when it performs the operation or function independent of concurrent human control.

To "obtain" or "produce" data is to perform any combination of operations that begins without the data and that results in the data. Data can be "obtained" or "produced" by any operations that result in the data. Data can be "obtained from" or "produced from" other data by operations that obtain or produce the data using the other data. An item of data is produced by "combining" other items of data when logical or numerical operations are performed on the other items of data that yield an item of data of the same type. For example, numbers indicating frequency can be combined by adding, by calculating the mean or average, by selecting one of the frequencies, by taking the square root of the sum of squares, or by another similar operation.

"Memory" is any component, combination of components, circuitry, or system that can store data, and may include local and remote memory and input/output devices. A processor "accesses" data in memory by any operation that retrieves or modifies the data, such as by reading or writing a location in memory that includes the data. A processor can be "connected for accessing" data by any combination of connections with local or remote memory or input/output devices that permits the processor to access the data. An example of memory is a storage medium access device with a data storage medium that it can access. A "data storage medium" or "storage medium" is a physical medium that can store data. Examples of data storage media include magnetic media such as floppy disks and PC cards (also known as PCMCIA memory cards), optical media such as CD-ROMS, and semiconductor media such as semiconductor ROMs and RAMs. As used herein, "storage medium" covers one or more distinct units of a medium that together store a body of data. For example, a set of floppy disks storing a single body of data would be a storage medium. A "storage medium access device" is a device with circuitry that can access data on a data storage medium. Examples of storage medium access devices include floppy disk drives and CD-ROM readers.

An "image" is a pattern of light. An image suitable for use as input to the image classification technique of the present invention may include graphical objects and characters that form text. An image may be divided into image segments, called "subimages" herein, each of which is itself an image. A subimage may be of any size up to and including the whole image. Data "defines" an image when the data includes sufficient information for the processor to directly produce the image. A "version" of a first image is a second image produced using an item of data defining the first image. The second image may be identical to the first image, or it may be modified by loss of resolution, by changing the data defining the first image, or by other processes that result in a modified version. An "image input device" is a device that can receive an image and provide an item of data defining a version of the image. A "scanner" is an image input device that receives an image by a scanning operation, such as by scanning a document.

A "character" is a single, discrete, abstract element or symbol. For example, a character can include an abstract symbol that appears in a written or printed form of a language. Characters in a language can include not only alphabetic and numerical elements, but also punctuation marks, diacritical marks, mathematical and logical symbols used in mathematical notation such as equations, and other elements used in the written or printed form of the language. More generally, characters can include phonetic, ideographic, or pictographic elements in addition to alphanumeric elements. For example, symbols in pictographic languages and symbols representing musical notation are included in the term character. A sequence of characters form a "text" or "string". A "glyph" is a single instance, or example, of a character that is realized as an image, for example on a marking medium such as paper or on a display screen. For example, an image that is produced by a scanning operation performed on a paper document that includes text and that is received by scanning circuitry includes a plurality of glyphs, each of which is an image that represents a realized instance of a respective one of the characters in the text.

Figure 4:
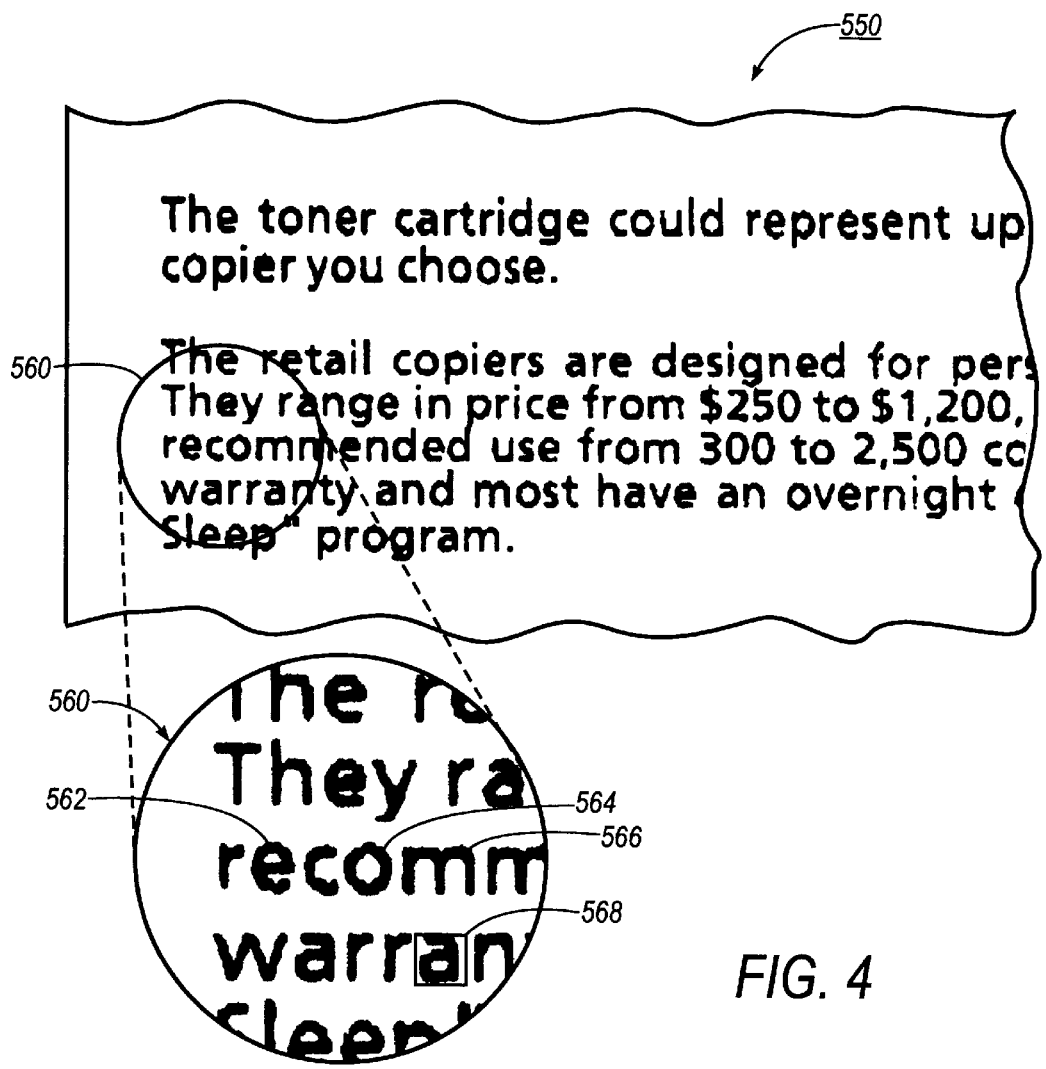
FIG. 4 illustrates a text image that is another example of the type of image that is suitable as input to the present invention.

The terminology "image definition data defining an image" (also referred to simply as a "image data") refers to a data structure, suitable for storage in a memory device of a processor-controlled machine, that defines an image. Image definition data defines a text image when a plurality of glyphs occur in the space defined by the image. Images of the type suitable as input to the present invention are assumed to be rectangular, and to have an image coordinate system in which x increases in a horizontal direction to the right, y increases in a vertical direction downward, and x=y=0 is at the upper left corner of the image. An image location is given by a set of image coordinates, (x, y). FIG. 4 provides an illustration of an image suitable as input to the present invention showing image coordinate system 504.

Each location in an image may be called a "pixel." In an array defining an image in which each item of data provides a value, each value indicating the color of a location may be called a "pixel value". Each pixel value is a bit in the "binary form" of the image, a grayscale value in a "grayscale form" of the image, or a set of color space coordinates in a "color coordinate form" of the image, the binary form, grayscale form, and color coordinate form each being a two-dimensional array defining the image.

A "binary image" refers to a representation of a two-dimensional data structure composed of image locations, commonly referred to as pixels, where a given location is either "ON" or "OFF." Binary images are manipulated according to a number of operations wherein one or more source images are mapped onto a destination image. The results of such operations are generally referred to as images. The input scanned image that is the starting point for the operation of the present invention will be referred to as the "input image." The image at a given stage in the processing will sometimes be referred to as the current image. Where certain processing steps are optional, the current image may be the input image. The image that results from an explicitly recited operation will sometimes be referred to as the resultant image. Image locations, or pixels, are conventionally defined to be ON if they are black and OFF if they are white, reflecting the fact that most images have a black foreground and a white background. It should be noted that the image classification technique of the present invention may operate equally as well using input images having a white foreground and black background. For convenience herein, where it is necessary to refer to an image location color, the discussion will be in terms of black on white.

AND, OR, and XOR are logical operations carried out between two images on a pixel-by-pixel basis. NOT is a logical operation carried out on a single image on a pixel-by-pixel basis.

An "image characteristic" is a measurable attribute of an image. An operation can "measure" an image characteristic by producing data indicating the characteristic using data defining an image. An image characteristic is measured "for an image" if the image characteristic is measured in a manner that is likely to produce approximately the same result each time the image characteristic occurs. An image characteristic is measured "relative to an image location" or "in relation to an image location" when the resulting data indicates the image characteristic in a manner that depends on the image location. For example, an image characteristic of a binary image may be measured relative to vertical or horizontal image edge locations included in an image by measuring the size of the runs of black image locations that occur from a first edge image location to a second edge image location in a horizontal or in a vertical direction in the binary image. Or, an image characteristic may be measured relative to an image location by measuring a distance in a direction extending from the image location to another selected image location that meets a criterion for selection. Or an image characteristic may be measured relative to an image location by measuring a number of other image locations that meet a criterion along each of a number of lines extending through the image location.

Data indicates a "central value" of an image characteristic when it has a value that depends on a number of measurements of the image characteristic and indicates the center of the distribution of measurements. For example, data can indicate a central value of distances or of measurements of another scalar quantity by indicating a mean, mode, median, or other measure of central value.

Data indicates a "distribution" of an image characteristic when it has a value that depends on a number of measurements of the image characteristic. For example, data can indicate a distribution of the frequency of occurrence of the sizes of runs of black image locations that occur in a horizontal or in a vertical direction in the binary image. In another example, data can indicate a distribution of distances or of measurements of another scalar quantity by indicating the central value of the measured distances; a measure of the variance of the measured distances; or a measure combining the central value and variance. Data can also indicate a distribution of distances by indicating frequency of each distance or by indicating distances at which maxima of frequency occur.

A "histogram" is data that indicates a distribution of an image characteristic by indicating frequency of occurrence of the values of the image characteristic. For example, if an image characteristic is measured over a range of magnitude or size, a histogram can indicate frequency as a function of the magnitude or size. The range can be divided into parts and the histogram can indicate the number of measurements occurring in each part. Thus a histogram can be used to find maxima of frequency, for example.

Image locations such as pixels are "neighbors" or "neighboring" within an image when there are no other pixels between them and they meet an appropriate criterion for neighboring. If the pixels are rectangular and appear in rows and columns, each pixel may have 4 or 8 neighboring pixels, depending on the criterion used.

An "edge" occurs in an image when two neighboring pixels have sufficiently different pixel values according to an appropriate criterion for the occurrence of an edge between them. The term "edge pixel" may be applied to one or both of two neighboring pixels between which an edge occurs.

A set of pixels in an image is "connected" if each pixel has at least one neighboring pixel that is in the set and if each pair of pixels in the set are connected by a subset of other pixels in the set. A connected set of pixels bounded by an edge may be called a "connected component" and this term may also be applied to more than one connected sets of pixels that are grouped for image analysis. In an image of text, connected components "form" text when the edges of the connected components generally follow the outlines of the parts of the text; if a text includes strokes, glyphs, or lines of glyphs, for example, connected components forming the text would have edges that generally follow the outlines of the strokes, glyphs, or lines of glyphs. Instances may occur in which a glyph includes more than one connected component and in which a connected component includes parts of two or more glyphs.

A "4-connected region" (or "4-connected component") is a set of ON neighboring pixels wherein any two pixels in the set can be joined by a path that includes the two pixels and includes only pixels in the set, and each pixel on the path is horizontally or vertically adjacent to at least one other pixel on the path. An isolated ON pixel that has no 4-connected neighbors may as a matter of definition be considered a 4-connected region. An "8-connected region" (or "8-connected component") is a set of ON neighboring pixels wherein any two pixels in the set can be joined by a path that includes the two pixels and includes only pixels in the set, and each pixel on the path is horizontally, vertically, or diagonally adjacent to at least one other pixel on the path. An ON pixel that has no 8-connected neighbors may as a matter of definition be considered an 8-connected region. The "size" of a connected component is the number of ON neighboring pixels in the set of pixels that comprise a connected component.

The "edge size" of connected components, when measured for an image, means one or more prominent values of the distribution of edge sizes of connected components found at a named type of edges in the image. For example, the "vertical edge size" of connected components means one or more prominent values of the distribution of vertical edge sizes of connected components found at vertical edges in the image; the vertical edge size is computed using image locations that occur at the end of horizontal runs of image locations. The "horizontal edge size" of connected components means one or more prominent values of the distribution of horizontal edge sizes of connected components found at horizontal edges in the image, and computed using image locations that occur at the end of vertical runs of image locations. "Vertical" and "horizontal" are used in their ordinary meaning and are referenced with respect to locations of lines of glyphs occurring in the image. "Width" of characters in an image of text similarly means one or more prominent values of the distribution of widths of characters in the text, measured in a direction approximately parallel to lines of text. "Height" of characters in an image of text means one or more prominent values of the distribution of heights of connected components in the text, measured in a direction approximately perpendicular to lines of text. A prominent value of a height, for example, could be a value at which a maximum frequency occurs in a histogram of heights. The "vertical edge pixel run" in an image of text means one or more prominent values of the distribution of vertical pixel runs of edge pixels in the text, measured in a direction approximately perpendicular to lines of text. A prominent value of a vertical edge pixel run, for example, could be a value at which a maximum frequency occurs in a histogram of vertical edge pixel runs. Analogous definitions may be assumed for horizontal edge pixel runs and the horizontal edge size of connected components.

The present invention makes use of image-based morphological operations. A number of morphological operations map a source image onto an equally sized destination image according to a rule defined by a pixel pattern called a structuring element (SE). The SE is defined by a center location and a number of pixel locations, each having a defined value (ON or OFF). Other pixel positions, referred to as "don't care," are ignored. The pixels defining the SE do not have to be adjacent to each other. The center location need not be at the geometrical center of the pattern; indeed it need not even be inside the pattern.

"Erosion" is a morphological operation wherein a given pixel in the destination image is turned ON if and only if the result of superimposing the SE center on the corresponding pixel location in the source image results in a match between all ON pixels in the SE and the underlying pixels in the source image. "Dilation" is a morphological operation wherein a given pixel in the source image being ON causes the SE to be written into the destination image with the SE center at the corresponding location in the destination image. An SE used for dilation typically has no OFF pixels. "Opening" is a morphological operation that consists of an erosion followed by a dilation. The result is to replicate the ON pixels in the SE in the destination image for each match of the ON pixels in the source image. "Closing" is a morphological operation consisting of a dilation followed by an erosion. For opening and closing, the result does not depend on the center location of the SE since each operation includes successive complementary operations with the same SE. The various operations defined above are sometimes referred to in noun, adjective, and verb forms. For example, references to dilation (noun form) may be in terms of dilating the image or the image being dilated (verb forms) or the image being subjected to a dilation operation (adjective form). No difference in meaning is intended.

B. General Features

The present invention produces an image characteristic of an input image data structure and uses the image characteristic to classify the input image as being either an image that has been scanned at low resolution at some prior point in its life cycle, or an "original" image, which, for purposes of this invention, is the term that will be used for an image that has not been scanned at low resolution at some prior point in its life cycle.

FIG. 1 shows some examples of document life cycles. Hard copy document 2 may have been printed at high resolution or produced as a copy using a digital or light lens copier or copier/duplicator. It then may be input to a low resolution scanning process 6 to produce a low resolution image data structure of document 2. Alternatively, an electronic image data structure 14 of a document may be created, such as by using a conventional word processor application. Electronic image data structure 14 may be input to a low resolution rendering process 8 to produce a low resolution image data structure of electronic document 4. Either of these low resolution image data structures may then be transmitted and received as low resolution image data structure 10. These processes are typical of those required in facsimile transmission of document images, but may also occur during the course of other types of document image processing.

Low resolution image data structure 10 may be input to a low resolution printing process 12 to produce a low resolution printed document 14. This printed document may then be input to a high resolution scanning process 18 which produces a high resolution image data structure 30, for purposes of some subsequent document image processing function, such as optical character recognition. FIG. 1 shows that document 14 may be further transformed, such as for example by a copying operation, prior to being input to high resolution scanning process 18. Alternatively low resolution image data structure 10 may be stored as data structure 22 in a memory device suitable for storing such data structures.

The present invention determines whether a high resolution image data structure has a document history like that of high resolution image data structure 30. If stored data structure 22 is used for some subsequent document image processing function, it is typically identifiable as being a low resolution image data structure by its stored format. It is when the low resolution image data structure is printed and then re-scanned at high resolution that it loses this identifying information.

1. Illustration and interpretation of an image characteristic.

The present invention identifies a suitable image characteristic as one that is related to the image locations that indicate the curved edge portions of symbols or graphical objects included in the input image; measurements made of this image characteristic provide data which may be used to accurately classify the input image as being either an original or a fax image. FIGS. 2–7 provide an illustration of why this image characteristic is related to predicting whether an input image is what is referred to herein as a "fax" image, i.e., an image that has been scanned or printed at low resolution at some point in its history prior to being scanned at high resolution for input to the present invention, as opposed to an image that is referred to herein as an "original" image.

Figure 2:
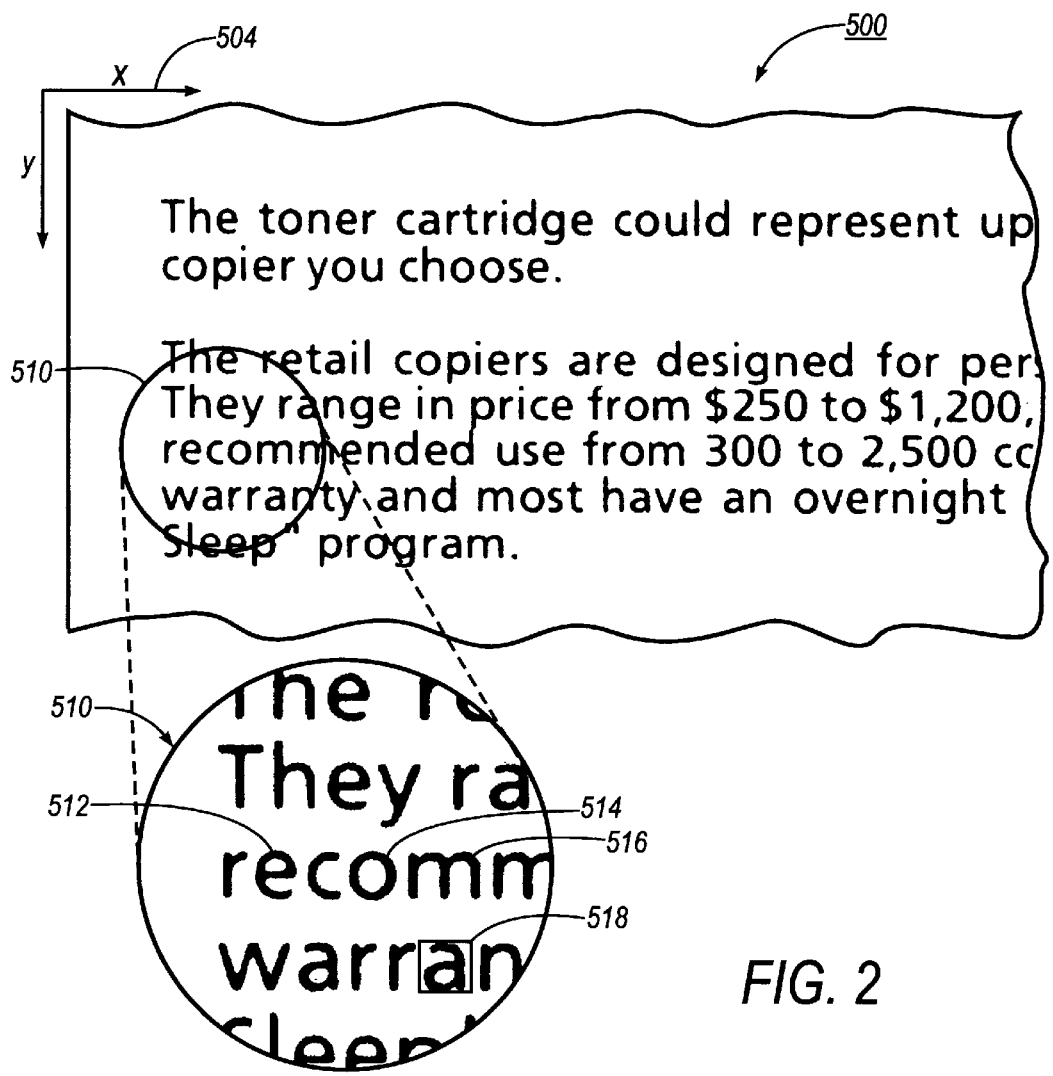
FIG. 2 illustrates a text image that is an example of the type of image that is suitable as input to the present invention.
Figure 3:
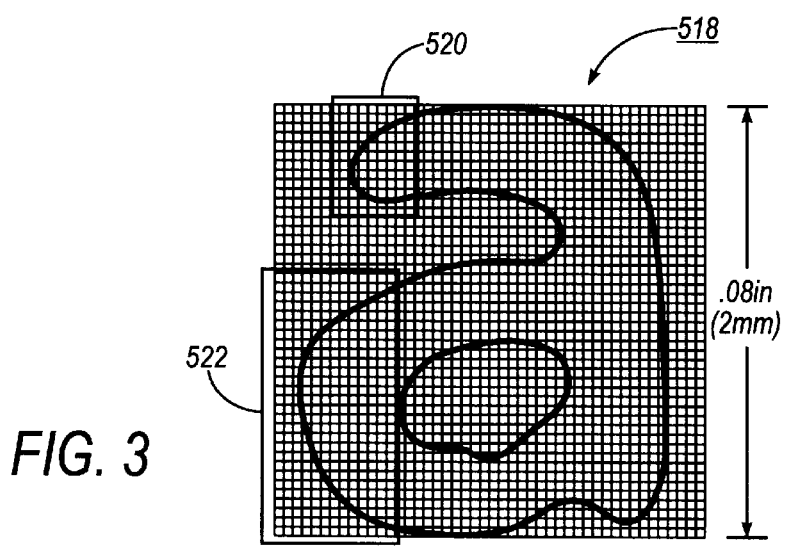
FIG. 3 illustrates an enlarged schematic image of a single glyph in the text image shown in FIG. 2, showing the outline of black image locations approximately to scale.

FIG. 2 illustrates an example of binary (e.g., black and white) image 500 that is of the type that is suitable as input to the image classification invention; image 500 is shown in FIG. 2 in a printed and enlarged form; it was printed from an electronic document at a resolution of 600 dpi, and the printed document was enlarged on a light lens copier. Image 500 is an example of what is referred to herein as an "original" image: image 500 has not been scanned or printed at low resolution at some point in its history prior to being printed for purposes of display in FIG. 2. Image 500 shows realized instances of characters in the character set that comprises the English language; each discrete representation of an English language character in image 500 is referred to as a glyph. Image segment 510, shown enlarged in FIG. 2, shows glyphs 512, 514, 516 and 518 specifically called out. When image 500 is scanned at a high resolution (e.g., 400 dpi), the image data structure that is produced is an example of high resolution image data structure 50 defining the contents of an input image to the processor of a machine being operated according to the image classification method of the present invention FIG. 3 shows a grid of image locations with an enlarged view of an outline of glyph 518 as it might be schematically represented to illustrate which image locations in the 600 dpi image are "ON" and which are "OFF;" in the original printed document of image 500, glyph 518 was approximately 0.08 inch (2 mm) in height, and the grid of image locations in FIG. 3 shows glyph 518 approximately to scale. Note that the color of the black pixels in the interior of glyph 518 as shown in enlarged view 510 has been omitted in FIG. 3 for purposes of illustration. Two areas of glyph 518 have been called out by boxes 520 and 522. These will be discussed further below.

FIG. 4 illustrates an example of black and white image 550 that is also of the type that is suitable as input to the image classification invention; image 550 is shown in FIG. 4 in a printed and enlarged form; it was printed as a result of a facsimile transmission of image 500 which was scanned in standard fax mode, at a resolution of 200×100 dpi; the printed document was then enlarged on a light lens copier for purposes of display in FIG. 4. Image 550 is an example of what is referred to herein as a "fax" image: displayed image 550 has been scanned or printed at low resolution at some point in its history. Image 550 shows the same glyphs that appear in image 500. Image segment 560, shown enlarged in FIG. 4, shows glyphs 562, 564, 566 and 568 specifically called out. When image 550 is scanned at a high resolution (e.g., 400 dpi), the image data structure that is produced is an example of high resolution image data structure 50 defining the contents of an input image to the processor of a machine being operated according to the image classification method of the present invention.

Figure 5:
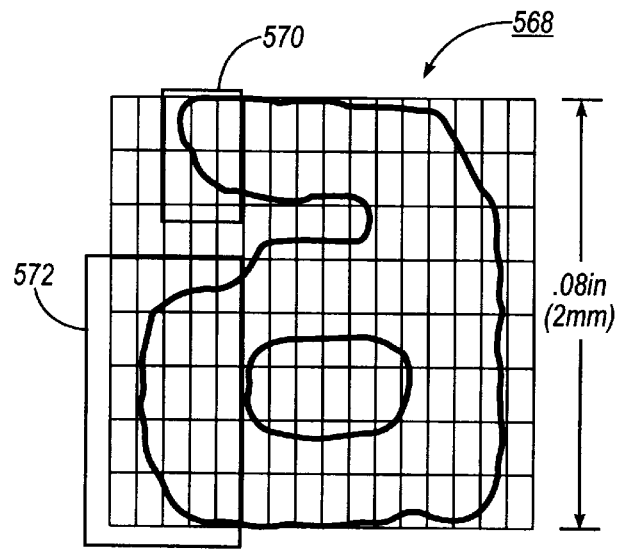
FIG. 5 illustrates an enlarged schematic image of a single glyph in the text image shown in FIG. 4, showing the outline of black image locations approximately to scale.

FIG. 5 shows a grid of image locations with an enlarged view of an outline of glyph 568 as it might be schematically represented to illustrate which image locations in the 200× 100 dpi image are "ON" and which are "OFF;" in the original printed document of image 550, glyph 568 was approximately 0.08 inch (2 mm) in height, and the grid of image locations in FIG. 5 shows glyph 568 approximately to scale. As with glyph 518 in FIG. 3, the color of the black pixels in the interior of glyph 568 has been omitted in FIG. 5 for purposes of illustration. Two areas of glyph 568 have been called out by boxes 570 and 572; these two areas approximately correspond in position to those called out in glyph 518 in FIG. 3.

It can be seen that areas 520 and 522 of glyph 518 (FIG. 3) in the original image are areas of the glyph that show curved portions of the character, where the image locations transition from being vertically oriented in the y direction of the image to being horizontally oriented in the x direction of the image, or from being horizontally oriented to being vertically oriented. These curved portions are hereinafter called the "curvilinear image edge locations" of a glyph, where the term "curvilinear" means formed, bounded or characterized by curved edges. Visual inspection of areas 520 and 522 of glyph 518 in FIG. 3 show that the curvilinear image edge locations of the glyph generally transition smoothly from the vertical to the horizontal orientation. In contrast, visual inspection of areas 570 and 572 of glyph 568 (FIG. 5) in the low resolution (fax) image—the areas where curvilinear image edge locations are expected to occur—show generally rectangular areas; the curvature of the expected curvilinear image edge locations in areas 570 and 572 of glyph 568 is less than the curvature in areas 520 and 522 of glyph 518 in FIG. 3.

Figure 6:
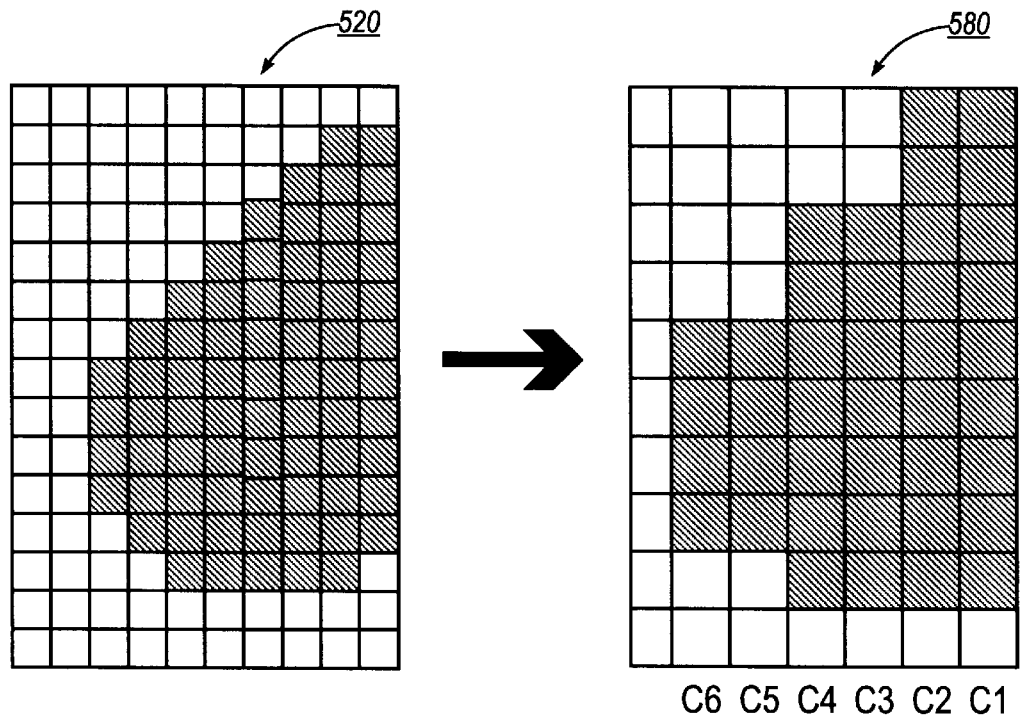
FIG. 6 shows a portion of the enlarged schematic image of FIG. 3 and an image pixel area that is the output of scanning the portion at a high resolution.
Figure 7:
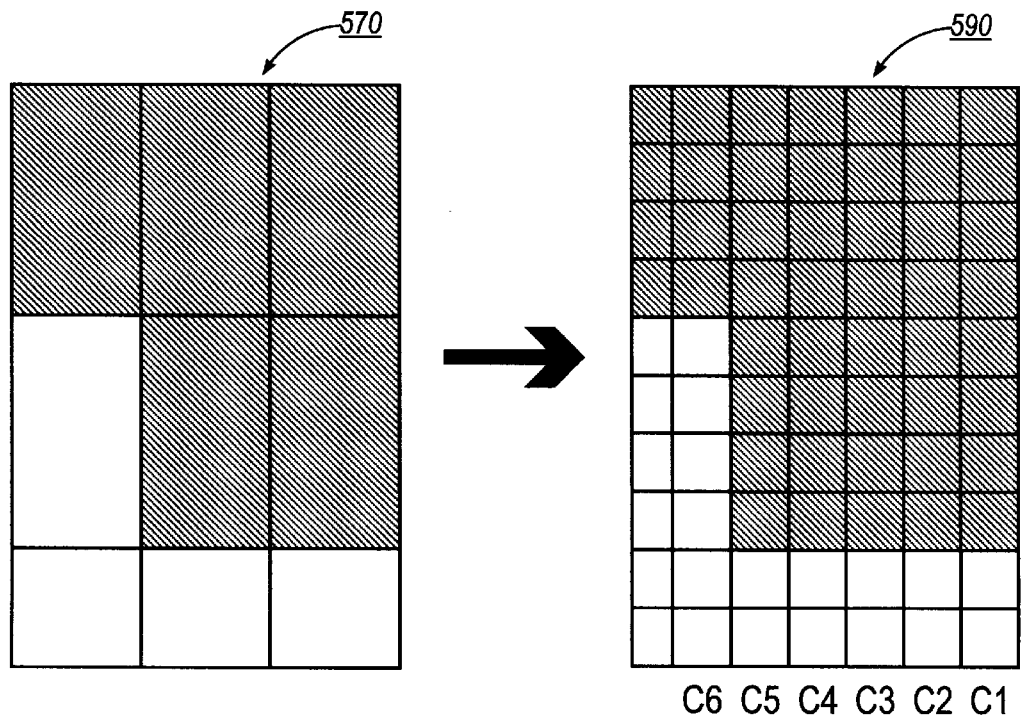
FIG. 7 shows a portion of the enlarged schematic image of FIG. 5 and an image pixel area that is the output of scanning the portion at a high resolution.

The edge portions of the glyphs that are expected to appear curved to a human viewer of the printed image appear characteristically rectangular in the low resolution image and appear characteristically curved in the original image; these characteristics of the curvilinear image edge locations are sufficiently preserved when each image is subsequently scanned at high resolution (e.g., 400 dpi) to enable classification of a scanned input image data structure as being either an original image or an image that has been previously scanned or printed at low resolution. FIGS. 6 and 7 illustrate how these characteristics are preserved. FIG. 6 shows area 520 of glyph 518 from FIG. 3 on the left side of the figure; scanned area 520 at the lower resolution of 400 dpi produces image pixel area 580 of glyph 518. FIG. 7 shows area 570 of glyph 568 from FIG. 5 on the left side of the figure; scanned area 570 at the higher resolution of 400 dpi produces image pixel area 590 of glyph 568. Scanned areas 520 and 570 show how these characteristics of the curvilinear image edge locations are preserved even after high resolution scanning of the respective images.

The present invention is intended to include as an appropriate image characteristic any suitable measurement of the image made in relation to the curvilinear image edge locations in the image, provided that the measurement produces data that may be used to accurately discriminate between images that have smooth curvilinear image edge locations and images that have more rectangular curvilinear image edge locations. One such image characteristic is the distribution of the curvilinear image edge locations in the image; various types of measurements of this distribution, such as the sizes of the curvilinear image edge locations, may produce data that may be used to accurately classify an image.

With reference again to FIGS. 6 and 7, in comparing image pixel area 580 with image pixel area 590, it can be seen that area 580 is made up of shorter runs of vertical pixels than the runs of vertical pixels in area 590. The vertical pixel columns have been labeled C1 to C6 in FIGS. 6 and 7, and the count of pixels in these columns is shown in Table 1.

TABLE I

| Vertical Pixel Column | Length of vertical pixel runs, Image Pixel area 580 (FIG. 8) | Length of vertical pixel runs, Image Pixel area 590 (FIG. 9) |
| --- | --- | --- |
| C1 | 9 | 8 |
| C2 | 9 | 8 |
| C3 | 7 | 8 |
| C4 | 7 | 8 |
| C5 | 4 | 8 |
| C6 | 4 | 4 |

The variation in the lengths of the vertical pixel runs in image pixel area 590 is noticeably less than the variation in the lengths of the vertical pixel runs in image pixel area 570.

This example illustrates differences found between images of a small area of a single glyph; similar changes in variations could be shown if the scanned image pixel area of area 522 of glyph 518 in FIG. 3 were compared with the scanned image pixel area of area 572 of glyph 568 in FIG. 5. In fact, similar changes in variations could be shown for substantially all of the glyphs that have curvilinear image edge locations, such as glyphs 512, 514 and 516 called out in enlarged area 510 of FIG. 2 and glyphs 562, 564 and 566 called out in enlarged area 560 of FIG. 4. Note that an image characteristic measured in relation to curvilinear image edge locations may also be found by examining the changes in variation of the horizontal pixel runs as well, although it is expected that the changes in the variations of the vertical pixel runs is likely to be more evident statistically. The distribution of the sizes (in this case, length) of the vertical pixel runs is a suitable measurement of the image characteristic because the distribution depends on the local slopes of the curved image edges. If the curves are smooth at the transition from the vertical to the horizontal edges, the size of the vertical pixel runs decrease. If curves are less smooth and more rectangular in appearance as a result of the prior low resolution printing or scanning, a distribution of longer vertical runs is expected.

2. General operation of the present invention.

Figure 8:
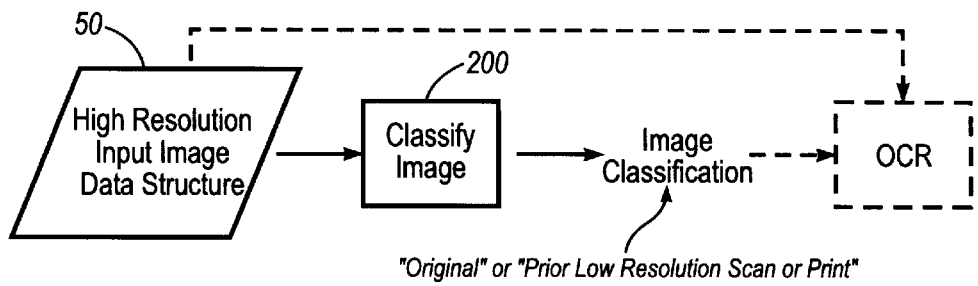
FIG. 8 is a general block diagram of the image classification technique of the present invention showing the input data structure and the output.

FIG. 8 is an overview block diagram showing the general processing of the present invention. High resolution image data structure 50 is input to classify process 200, which measures an image characteristic of image data structure 50 and classifies the document using the measured image characteristic. FIG. 8 shows that high resolution image data structure 50 and the image category may be subsequently input to a document image processing operation such as an OCR operation.

Figure 9:
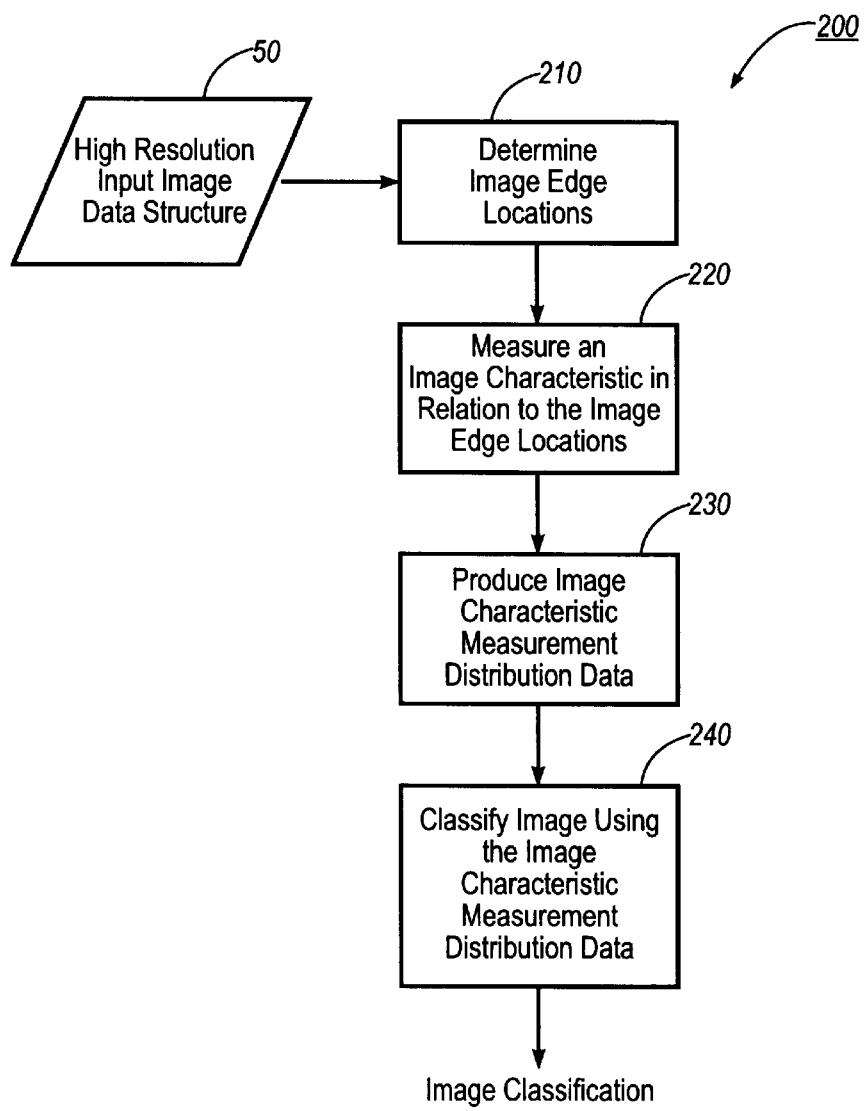
FIG. 9 is a flowchart of the expanded block 200 of FIG. 8 showing processing operations of the present invention.

FIG. 9 is a flow chart illustrating the general steps of the present invention, using high resolution image data structure 50 as the input image. The image locations in high resolution image data structure 50 are analyzed, in box 210, to determine the image edge locations of the glyphs and graphical objects that are included in the image; the image edge locations are determined in either the horizontal or vertical direction in the image. Any suitable individual or combination of image processing operations that can identify the vertical or horizontal edges is appropriate to accomplish the function in box 210. Specific operations are described below in the description of the illustrated embodiments of the present invention. The image edge locations that are determined include image locations indicating the "expected" curvilinear image edge locations of glyphs and graphical objects included in the image. These image edge locations are referred to as expected because they are the image edge locations such as those shown in areas 520 and 522 of FIG. 3 that are expected to be curved image edges in an original image, and are likely to be much less curved in a fax image.

Next, an image characteristic is measured, in box 220, in relation to the image edge locations in input image 50 to produce measurement data of the image characteristic. The image characteristic is selected to provide information about the expected curvilinear image edge locations of the glyphs and graphical objects that are included in image 50. The measurement is selected to provide data that may be used to accurately discriminate between images that have smooth curvilinear image edge locations and those that have less curved and more rectangular curvilinear image edge locations.

A data structure indicating a distribution of the image characteristic measurement data, referred to for convenience as the measurement distribution data, is produced next, in box 230. The present invention accomplishes image classification by statistically interpreting the measurements taken of the image characteristic in relation to the expected curvilinear image edge locations; thus, some appropriate distribution of these measurements provides data from which an accurate classification may be made.

A statistical interpretation of the measurement distribution data is then used to classify the image, in box 240. The statistical interpretation produces a numerical result that is compared to a threshold numerical result to make a determination as to image classification. This threshold is typically experimentally derived by analyzing the results of measurement distribution data produced for sets of test documents. Examples of statistical interpretations are discussed below in the description of two illustrated embodiments; however, any statistical interpretation of the measurement distribution data is suitable if it is designed to indicate the extent of curvature of the expected curvilinear image edge locations of glyphs and graphical objects included in the image.

C. Two Embodiments of the Invention

Two embodiments of the present invention have been implemented in a software program on a Sun Microsystems SparcStation 10 computer running the SunOS 4.1.3 operating system, available from Sun Microsystems of Mountain View, Calif. The software programs implementing the invention are written in a standard version of the ANSI C programming language in conjunction with the standard ANSI C libraries supplied by Sun Microsystems with their ANSI C compiler. It will be apparent to those of skill in the art that a wide variety of programming languages and hardware configurations could readily be used in place of those in the illustrated embodiment based on the description herein without departing from the scope and intended utility of the present invention. All time estimates given in this detailed description for completion of certain processes are given with respect to the implementation of the respective illustrated embodiment on the Sun Microsystems SparcStation 10 computer configured as described above.

The description of the illustrated implementation that follows presumes a knowledge of fundamental image processing techniques, including image morphology. One of many useful texts in this regard is *Matrix Structured Image Processing* by Dougherty and Giardina (Prentice-Hall, 1987). Chapter 4, at pp. 98–130, of that text discusses morphology; chapter 4 is hereby incorporated herein by reference as if set out in full. Also of interest as background is Dan S. Bloomberg, "Multiresolution morphological analysis of document images", *SPIE Conf.* 1818, *Visual Communications and Image Processing '92*, Boston, Mass., November 1992, pp. 648–662, which describes image-based approaches to document image analysis based on image shape and texture properties; this article is also hereby incorporated herein by reference as if set out in full.

1. A first illustrated embodiment of the present invention.

The image characteristic measured in the first illustrated embodiment is the height of the 8-connected components of the vertical image edge locations of the scanned input image. Producing a distribution of the measurements of this image characteristic in relation to the curvilinear image edge locations shows that there are statistically more 8-connected components at the very lowest values of height (e.g., at heights of 1 or 2 pixels) in an original image than are found in a fax image, and that, except for tall 8-connected components (e.g., at heights in the 15–20 pixel range), there are statistically fewer 8-connected components at what may be referred to as medium values of height (e.g., at heights ranging from 4–15 pixels) in an original image than are found in a fax image. Experimental data shows that there are more 8-connected components on the vertical edges of glyphs in fax images having medium-valued heights (i.e., short 8-connected components having heights in the range of 4–10) than in original images. This characteristically occurs because re-scanning the larger (both longer and wider) fax pixels at a higher resolution produces vertical pixel runs at the edges of glyphs that are of these medium lengths, while the re-scanning also produces longer horizontal pixel runs at the horizontal edges, since the tops of the fax pixels are horizontally wider and flat. (See e.g., FIG. 5) When an operation to identify 8-connected components is run on these vertical edges from a re-scanned fax image, fewer very tall 8-connected components are identified than would be identified in an original image because the longer horizontal pixel runs prevent taller 8-connected components from existing; the horizontal pixel runs at the edges that are created by re-scanning in effect break apart what might otherwise be taller 8-connected components, leaving more 8-connected components at medium height values.

In contrast, experimental data for an original image shows that the 8-connected components on the strictly vertical edges of glyphs have larger height values (i.e., they are taller) because this breaking apart does not occur at all or occurs less frequently when an original image is re-scanned; in addition, at the curvilinear edges near the horizontal tops of glyphs, there are more isolated single or double pixels that produce more 8-connected components at the lowest height values, and fewer 8-connected components at the medium height values.

Figure 10:
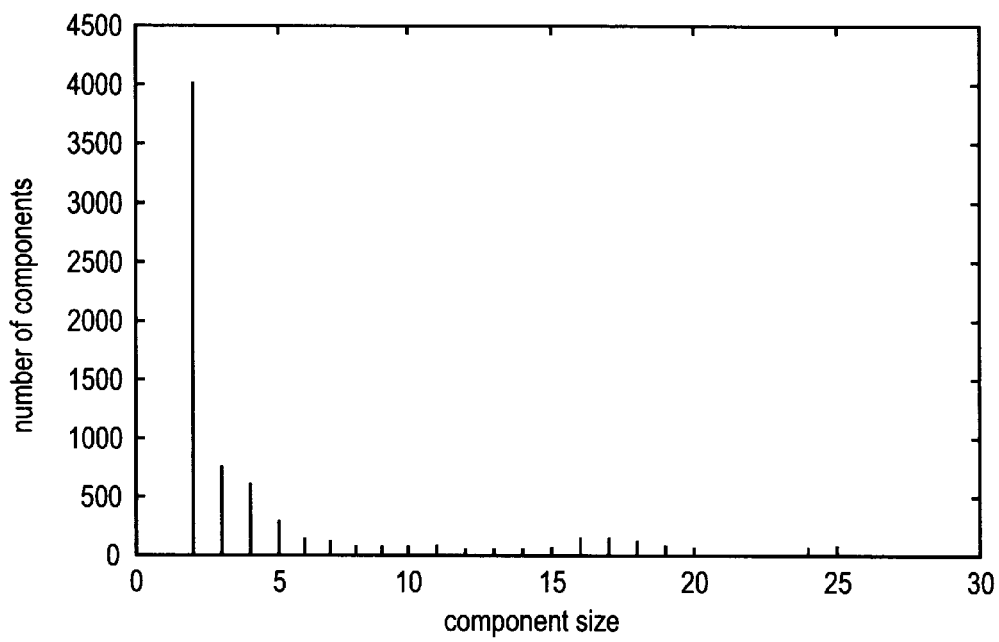
FIG. 10 shows a histogram of the number of components that are found for each measured component height of the 8-connected components extracted from an original image re-scanned at 400 dpi for input into a first embodiment of the image classification technique of the present invention.
Figure 11:
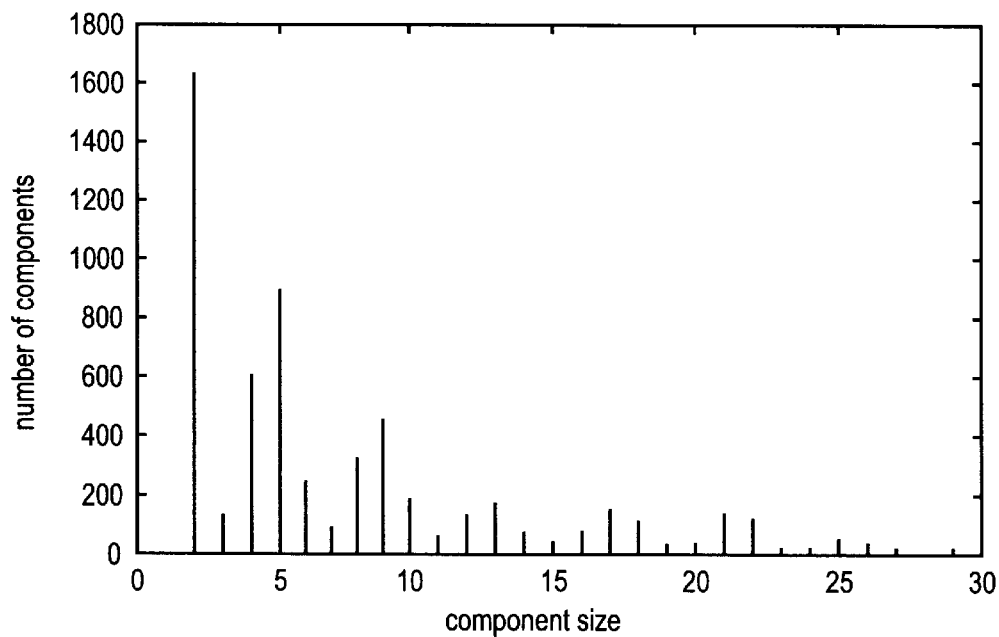
FIG. 11 is a histogram of the number of components found for measured heights of 8-connected components extracted from the same image represented in the histogram of FIG. 10, where the input image represented in FIG. 11 was scanned at standard fax resolution and printed prior to being re-scanned at 400 dpi for input into a first embodiment of the present invention.

FIGS. 10 and 11 each show a histogram of the number of components that are found for each measured component height, h, of the 8-connected components extracted from an original and standard fax image, respectively; FIG. 10 shows the distribution for an original image re-scanned at 400 dpi for input into the image classification technique; FIG. 11 shows the distribution for the same image that was scanned at standard fax resolution and printed prior to being re-scanned at 400 dpi for input into present invention. These histograms reveal the characteristic differences described above between an original and the fax version of an image which can be statistically exploited to classify the image accurately. For example, it can be seen that the originals have relatively small populations of 8-connected components above h=3, with a typically monotonically decreasing distribution out to around h=10, and a little wide bump around h=20, corresponding to the x-height of the characters. The fax images have a small value at $y_3$, significant populations at $y_4$ and $y_5$, and notable spikes at intervals of 4 pixels, starting at $y_5$. Although their histograms are not shown, similar characteristics are experimentally exhibited for distributions of 8-connected components when original and fax images are scanned at 300 dpi.

Figure 12:
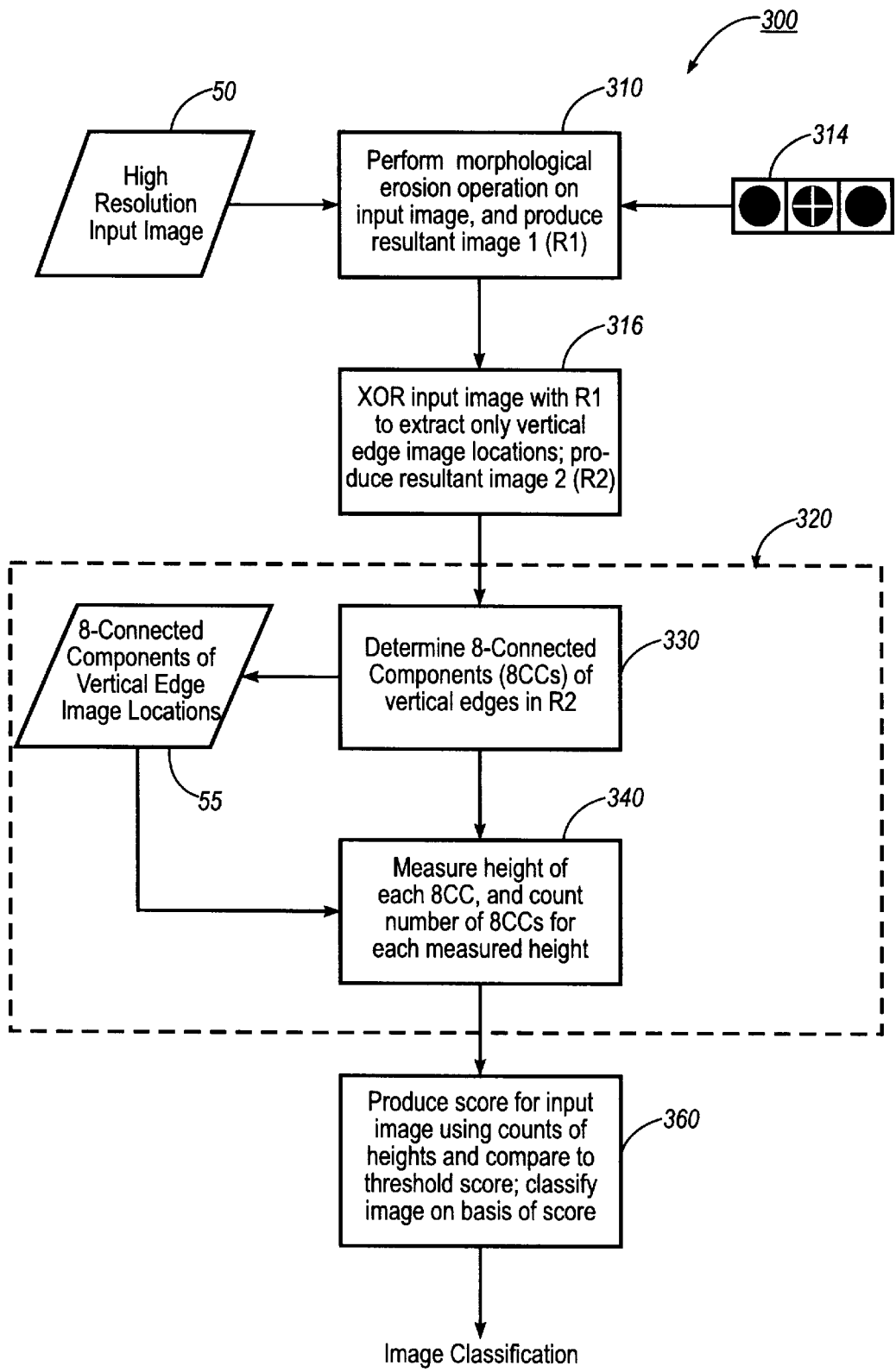
FIG. 12 is a flowchart illustrating a first embodiment of image classification according to the present invention that uses as an image characteristic the height of 8-connected components of the vertical image edge locations of an input image.

Turning now to the flow chart of FIG. 12, the first illustrated embodiment of the present invention begins with processes 310, 316 and 320 that are designed to identify and extract 8-connected components of the vertical image edge locations in input image 50. In particular, the vertical edge pixels are extracted, in boxes 310 and 316, by first performing a morphological erosion operation with structuring element (SE) 314. The center of SE 314 is marked with a "+". The erosion operation produces a resultant image (identified as R1). Process 316 then performs an XOR operation using R1 and input image 50. The combination of processes 310 and 320 produces a resultant image (identified as R2) containing the vertical edge 4-connected locations as separate components.

Then, the height of the 8-connected components of the vertical image edge locations in R2 are identified, in processes 330 and 340, using any efficient operation. For example, process 330 may be a routine that finds the bounding boxes of the 8-connected components in the vertical image edge locations. Process 330 produces resultant image 55 shown in FIG. 12. Process 340 measures the height of each 8-connected component in image 55, and produces a distribution of the number of 8-connected components for each measured height. The data produced by process 340 is similar to that shown in the histogram examples of FIGS. 10 and 11.

Figure 12A:
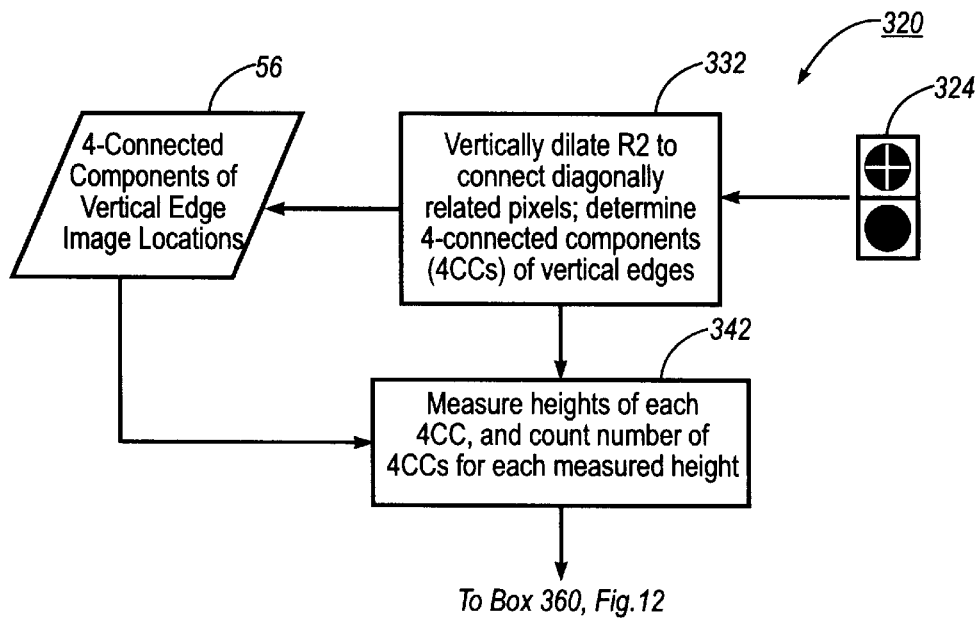
FIG. 12A is a flowchart illustrating an alternative processing technique to that shown in FIG. 12 for measuring the height of 8-connected components of the vertical image edge locations of the input image.

In the illustrated embodiment, processes 330 and 340, which are enclosed in and collectively labeled as dotted line box 320, are implemented as shown in FIG. 12A. FIG. 12A illustrates a technique for turning the 8-connected components in the vertical image edge locations in R2 into 4-connected components, so that the 4-connected components may be measured. This technique may be used in place of a less efficient routine for finding the 8-connected components in the vertical image edge locations in R2. First, in box 332, a small vertical dilation is performed on the R2 image using structuring element (SE) 324, showing its center marked with a "+". The vertical dilation adds corner pixels to the 8-connected components in R2, thereby joining adjacent 4-connected vertical runs into a single 4-connected component; process 332 produces resultant image 56 shown in FIG. 12A. Each of the 4-connected components of image 56 are in one-to-one correspondence with the 8-connected components of R2 and are one pixel taller in height. Note that this increased 1-pixel height is reflected in the histograms showing the distributions of the original 8-connected components in R2; for example, the histograms in FIGS. 10 and 11 show the smallest 8-connected component height as 2. Then, in box 342, the heights of the 4-connected components are measured, and a count is made of the number of 4-connected components for each height.

Returning now to FIG. 12, the measurement distribution data produced by either process 340 or 342 is then used to classify the input image as being an original or a fax image, in process 360. A statistical interpretation of the measurement distribution data produces a numerical result, called a "score", which is then compared against a threshold score to make the final classification decision. In this first illustrated embodiment, the numerical result produced by, $score_{400}$ of Equation (1) below provides an effective and accurate discriminating interpretation of the measurement distribution data for input images scanned at either 300 dpi or 400 dpi.

$$score_{400}=(-y_3+y_4+y_5+y_6+y_7+y_8+y_9)/y_2 \qquad (1)$$

In Equation (1), the variable y represents the number of 8-connected components, and the index of y represents the 8-connected component height; thus, the sum of the positive number of 8-connected components at heights 4, 5, 6, 7 8 and 9 plus the negative of the number of 8-connected components at height 3 is divided by the number of 8-connected components at height 2. Dividing by the number of 8-connected components at height 2 effectively normalizes the score to the peak of short 8-connected components that are expected to be found in an original image; scores for original images are thus expected to be smaller than scores for fax images.

In the illustrated embodiment of FIG. 12, a threshold of 0.7 effectively discriminates between original and fax images; scores above the threshold are fax images. This threshold is experimentally derived from experiments using the present invention on sets of test documents. Details of these experiments are provided below.

Table 2 shows the data from the histograms of FIGS. 10 and 11. The statistical interpretation of the data of FIG. 10 produces a $score_{400}=0.065$, and the statistical interpretation of the data of FIG. 11 produces a $score_{400}=1.519$.

TABLE 2

| 8-Conn. Comp. counts | Histogram data of FIG. 10 | Histogram data of FIG. 11 |
|---|---|---|
| $y_2$ | 4000 | 1675 |
| $y_3$ | 750 | 135 |
| $y_4$ | 600 | 600 |
| $y_5$ | 200 | 935 |
| $y_6$ | 100 | 265 |
| $y_7$ | 50 | 80 |
| $y_8$ | 20 | 335 |
| $y_9$ | 40 | 465 |

Image classification technique 300 illustrated in the flowchart of FIG. 12 takes approximately 2 seconds to classify a full image scanned at 300 dpi, constituting 8 million pixels, when executed on a Sun Microsystems SparcStation 10. Note also that image skewing of a few degrees is unlikely to have any significant effect on the image classification process, and it is not necessary to deskew, or otherwise compensate for, minor skewing of the scanned input image.

2. Using a portion of the input image.

It is not necessary to use input image 50 in its entirety for purposes of classification according to the technique of the present invention. Selection of a subimage portion of input image 50 will work as well as using the entire image, as long as the selected subimage contains glyphs or other symbols or graphical objects that include curvilinear edges.

Figure 13:
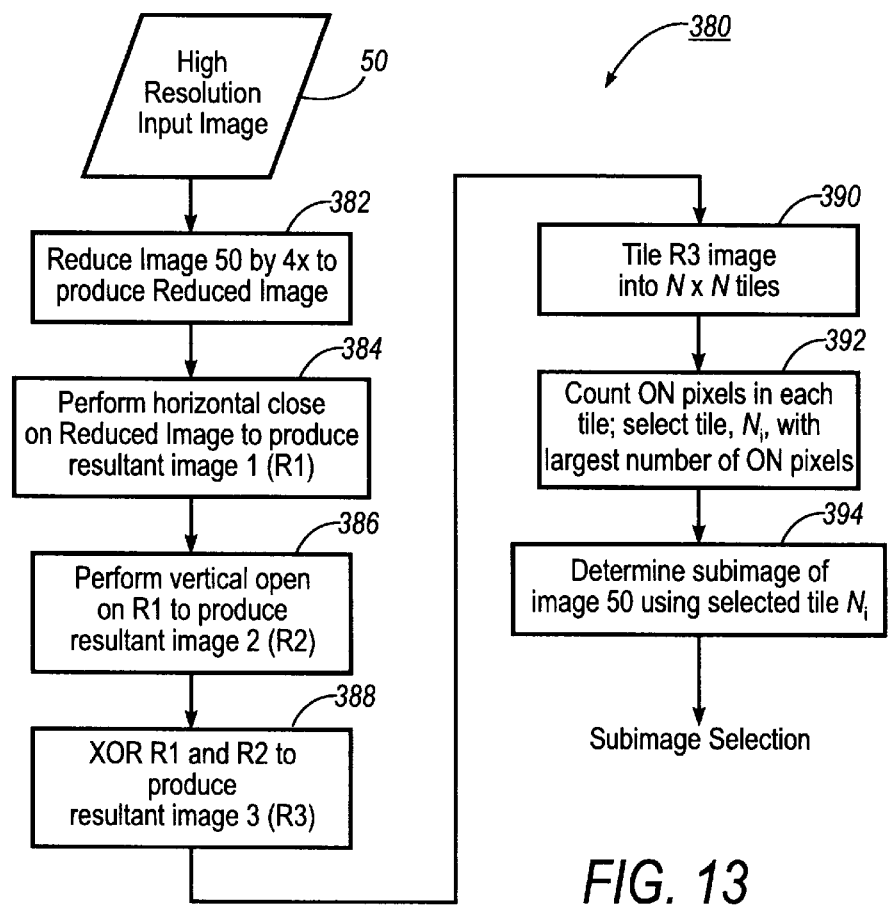
FIG. 13 is a flowchart showing the process for automatically selecting a suitable subimage of input image for image classification according to the present invention.

FIG. 13 is a flowchart showing the process 380 for automatically selecting a suitable subimage of input image 50 for image classification. Note that the letter N below represents the subsampling (by tiles) of the image; for example, a value N=3 represents choosing a tile for analysis that covers one-ninth (⅑) of the image.

Input image 50 is first reduced, in box 382, by a factor of 4 (4×) using a threshold reduction with thresholds 1 and 1 on each 2× reduction. A detailed explanation of this threshold reduction technique is provided in D. S. Bloomberg, "Image analysis using threshold reduction," *SPIE Conf.* 1568, *Image Algebra and Morphological Image Processing II*, San Diego, Calif., July 1991, pp. 38–51, which is hereby incorporated by reference herein, as if set out in full. Morphological operations that enhance the text-like character of the image are then performed; these include a horizontal closing, in box 384, to join characters and some words in a text line, followed by a vertical opening, in box 386, to remove the text lines; an XOR is then performed, in box 388, between the resultant images of the horizontal closing and vertical opening, which restores blocked-up text lines. In addition to enhancing the weight of the text parts, these operations also remove any halftone images or stipples that would have unusually high weight in the processes 310, 320 and 330 of FIG. 12 (i.e., the 8-connected component vertical edge extraction operations.) After performing processes 382, 384, 386, and 388, resultant image R3 is then tiled into N×N identical tiles, in box 390, and the ON pixels in each tile are counted in box 392. The tile having the most ON pixels is selected as the subimage for input to the image classification technique, in box 394. Note that it is the full resolution image of this tile, which is a subimage of input scanned image 50, and not the tiled portion of the R3 image, that is input to the classification operation.

Experimental results show that as little as 7% of input image 50 will produce an accurate classification of the image. Using a smaller part of the scanned input image has the added benefit of decreasing the computation time required to classify the image. The operation of automatically selecting the tile adds a fixed and relatively small amount of time—about 0.2 sec for a 300 dpi image—to the entire computation needed to perform image classification. However, the time required for the classification decision is inversely proportional to the number of tiles, scaling as $1/N^2$. As smaller pieces are selected, the statistical noise increases; it has been shown experimentally that $N \leq 4$ gives excellent results for 400 dpi images using the illustrated embodiment shown in FIG. 12. For N=4, the tiles have about 1 million pixels, and, in contrast to the 2 seconds reported above for making the classification decision using an entire image, accurate image classification is accomplished using the method illustrated in FIG. 12 in less than 0.5 second on the SparcStation 10 using a subimage of N=4 scanned at 300 dpi.

3. A second illustrated embodiment of the present invention.

The image characteristic measured in the second illustrated embodiment is the run length (i.e., number of pixels) of the 4-connected components of the vertical image edge locations of the scanned input image. Producing a distribution of the measurements of this image characteristic in relation to the curvilinear image edge locations shows that there are statistically more vertical pixel runs of length 1 and statistically fewer vertical pixel runs of other lengths in an original image than is found in a fax image. This distribution reflects the expected result that, for an original image, there are more single 4-connected components on the vertical sides of glyphs in an original image than in a fax image.

Figure 14:
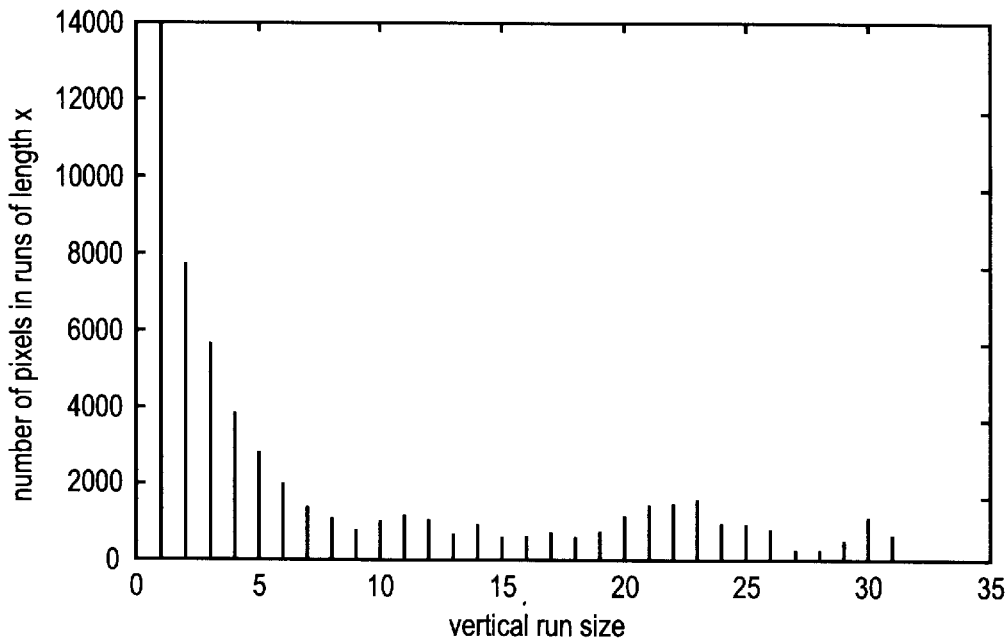
FIG. 14 is a histogram showing on the y-axis the total number of pixels counted for each length on the x-axis representing lengths of vertical pixel runs extracted from an original image re-scanned at 400 dpi for input into a second embodiment of the image classification technique of the present invention.
Figure 15:
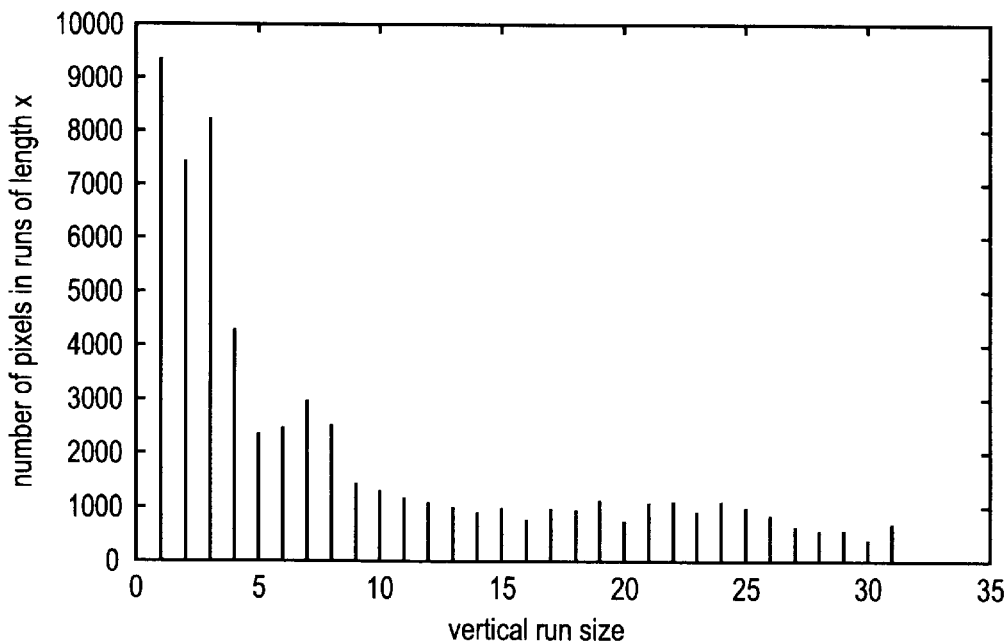
FIG. 15 is a histogram showing on the y-axis the total number of pixels counted for each length on the x-axis representing lengths of vertical pixel runs extracted from the same image represented in the histogram of FIG. 14, where the input image represented in FIG. 15 was scanned at standard fax resolution and printed prior to being re-scanned at 400 dpi for input into a second embodiment of the present invention.

FIGS. 14 and 15 each show on the y-axis a count of the number of pixels in the total number of vertical pixel runs of length x shown on the x-axis, where the vertical image edge pixel runs are extracted from an original and standard fax image, respectively. Note that the y variable gives the number of pixels (not the number of runs) that belong to vertical runs of each run length. FIG. 14 shows the distribution for an original image re-scanned at 400 dpi for input into the second embodiment of the image classification technique; FIG. 15 shows the distribution for the same image that was scanned at standard fax resolution and printed prior to being re-scanned at 400 dpi for input into the second embodiment of the present invention. These histograms, each of which may also be referred to as a pattern spectrum, reveal characteristic differences between an original and the fax version of an image that can be statistically exploited to classify the image accurately.

Figure 16:
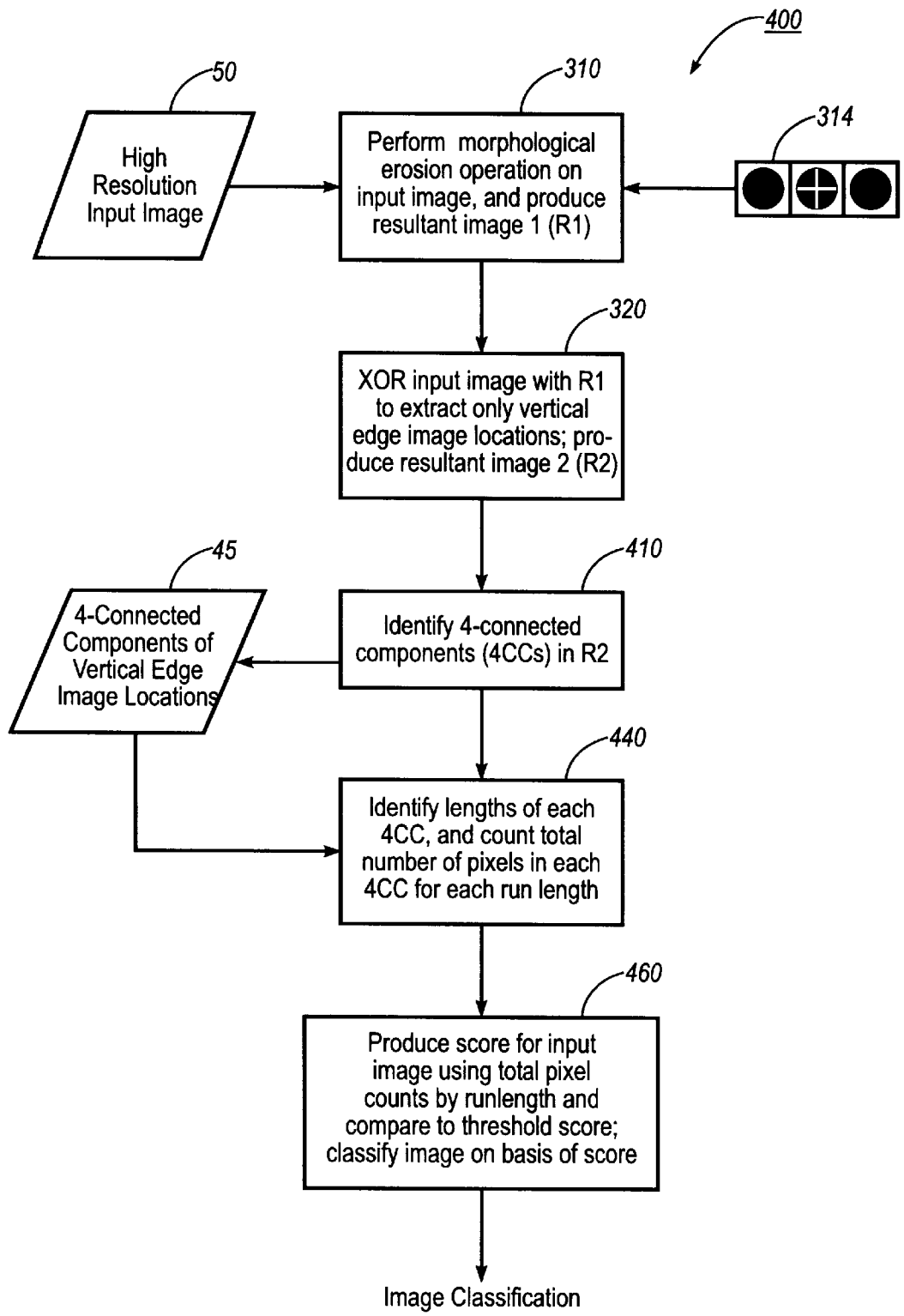
FIG. 16 is a flowchart illustrating a second embodiment of image classification according to the present invention that uses as an image characteristic the length of 4-connected components of the vertical image edge locations of an input image.

The second illustrated embodiment of the present invention is illustrated in FIG. 16. Processes 310 and 320, which are the same operations as performed in the first illustrated embodiment of FIG. 12, are designed to identify and extract the vertical edge 4-connected image locations in input image 50. The vertical edge pixels are extracted, in box 310, by performing a morphological erosion operation with structuring element (SE) 314, producing a resultant image (identified as R1), followed by an XOR operation using R1 and input image 50. The combination of processes 310 and 320 produces a resultant image (identified as R2) containing the vertical edge 4-connected locations as separate components. Process 410 is the operation of identifying these 4-connected components by any suitable technique. One such technique is identifying the bounding boxes of the 4-connected components. Another technique is identifying the vertical pixel runs, since these 4-connected components of the vertical edge pixels are identical to the vertical pixel run lengths. Process 440 identifies the lengths of the vertical pixel runs and counts the number of pixels in the vertical runs identified for each length. Process 440 can be combined with process 410 when the 4-connected components are identified by finding the vertical pixel runs.

The vertical run length data produced by process 440 is essentially that shown in the histograms of FIGS. 14 and 15 and is the measurement distribution data referred to in box 230 of FIG. 9. This data is then used to classify the input image as being an original or a fax image, in process 460. As with the first embodiment, a statistical interpretation of the vertical run length data produces a score, which is then compared against a threshold score to make the final classification decision. In this second illustrated embodiment, the numerical result produced by $score_{16}$ of Equation (2) below provides an effective and accurate discriminating interpretation of the measurement distribution data for input images scanned at either 300 dpi or 400 dpi and processed according to the processes in FIG. 16. The subscript "16" in $score_{16}$ is used merely to reference Equation 2 to FIG. 16, and has no other significance.

$$score_{16} = (y_2 + y_3 + y_4 + y_5 + y_6 + y_7 + y_8 + y_9)/y_1 \quad (2)$$

Equation (2) has been derived from the data shown in the pattern spectra of FIGS. 14 and 15. As already noted, the variable y represents the total number of pixels (and not runs) included in the vertical runs having the x-axis length indicated by the subscript index. FIG. 14 shows the pattern spectrum for an original image to be relatively smooth, nearly monotonically decreasing with pixel run length, whereas the histogram for a fax image in FIG. 15 has a "rough" appearance and has significant weight for lengths 2 and 3, as well as a "bump" between about 6 and 9 pixels in length, which is entirely absent in the original. The spectrum of the originals was smooth, and lacking in the "bump." Equation (2) exploits these salient features of the vertical pattern spectrum to differentiate between original and fax images. The sum of the total number of pixels in vertical runs of length 2, 3, 4, 5, 6, 7, 8 and 9 is divided by the total number of pixels in the vertical runs of length 1. Dividing by the total number of pixels in the vertical runs of length 1 effectively normalizes the score to the peak of the smallest vertical runs that are expected to be found in an original image; scores for original images are thus expected to be smaller than scores for fax images.

In the illustrated embodiment of FIG. 12, a threshold of approximately 2.0 should effectively discriminate between original and fax images; scores above the threshold are fax images. This threshold is experimentally derived from experiments using the present invention on sets of test documents. Details of these experiments are provided below.

Table 3 shows the data from the histograms of FIGS. 14 and 15.

TABLE 3

| Vertical Run Length counts | Histogram data of FIG. 14 | Histogram data of FIG. 15 |
|---|---|---|
| $y_1$ | 14000 | 9500 |
| $y_2$ | 7500 | 7500 |
| $y_3$ | 5500 | 8100 |
| $y_4$ | 3700 | 4200 |

TABLE 3-continued

| Vertical Run Length counts | Histogram data of FIG. 14 | Histogram data of FIG. 15 |
|---|---|---|
| $y_5$ | 2200 | 2500 |
| $y_6$ | 2000 | 2600 |
| $y_7$ | 1800 | 3100 |
| $y_8$ | 1700 | 2800 |
| $y_9$ | 1000 | 1500 |

The statistical interpretation of the data of FIG. 14 produces a $score_{16}=1.8$, while the interpretation of the data of FIG. 15 produces a $score_{16}=3.4$.

D. The Machine and Software Product of the Invention

1. The machine of the present invention.

Figure 17:
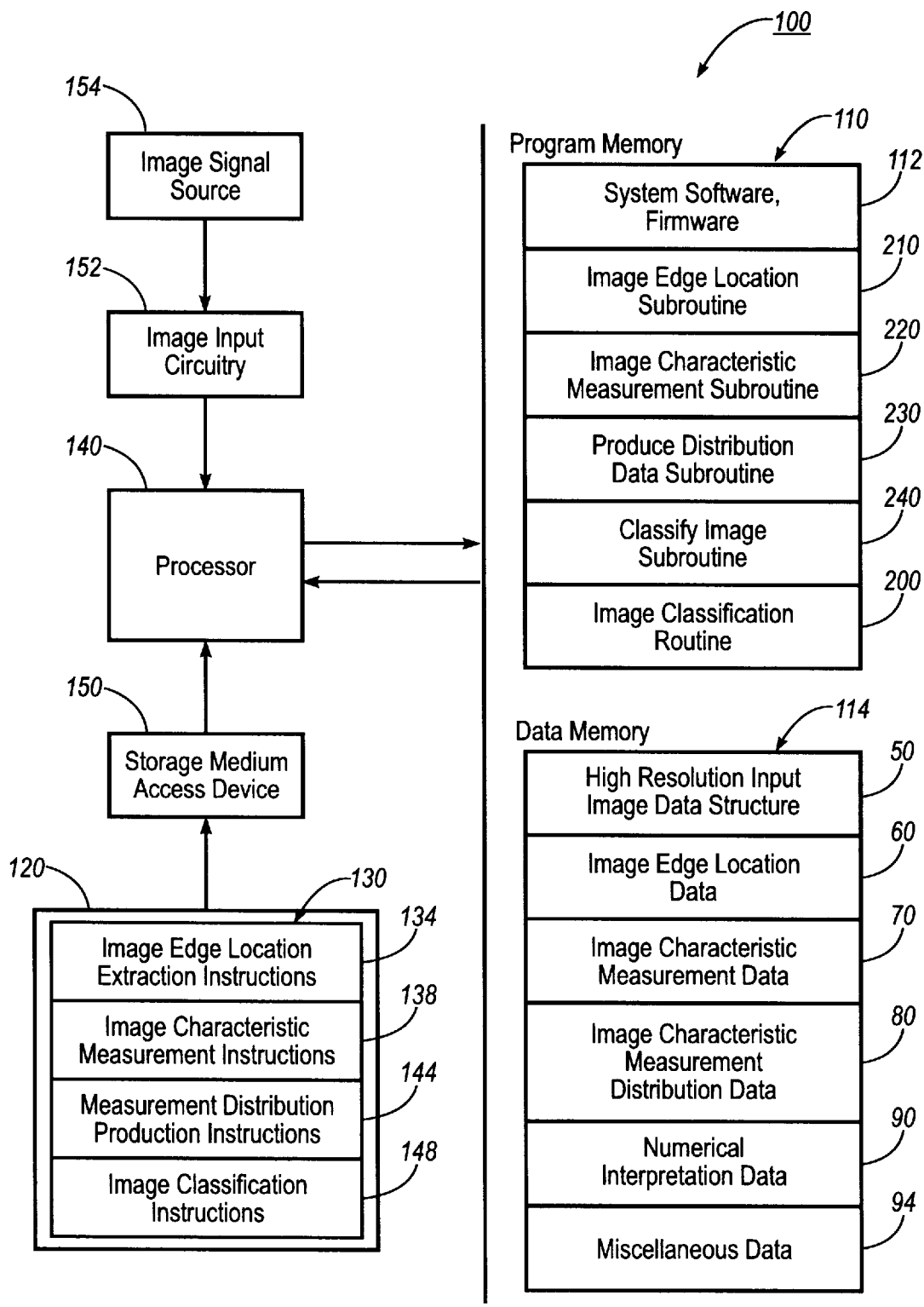
FIG. 17 is a simplified block diagram illustrating a machine in which the image classification technique of the present invention may be used, and a software product that stores instruction data for implementing the present invention on the machine.

FIG. 17 is a block diagram of a generalized, processor-controlled image processing machine 100. The present invention operates any machine having the common components, characteristics, and configuration of machine 100 illustrated in FIG. 17. For example, machine 100 may be a general purpose computer, a special purpose computer optimized for image processing operations, or a combination of a general purpose computer and auxiliary special purpose hardware. The machine configuration illustrated at this high level is a known configuration. However, a machine such as machine 100 suitably programmed to embody the present invention is not a standard or known configuration.

Generally, the input image is provided from an image source device 154, which might be a scanner or storage device. An input image 50 is forwarded via input image circuitry 152 to processor 140 and may be stored in data memory 114. Processor 140 may be included in any well-known device, such as a general purpose computer, configured according to the present invention. In response to a signal initiating the image classification method of the present invention, processor 140 produces the result of the image classification method applied to an input image 50. The result may be stored in data memory 114, or in any other suitable storage device, or it may output to a destination device (not shown) such as a printer, display, or facsimile machine,.

Processor 140 operates by accessing program memory 110 to retrieve instructions, which it then executes. Program memory 110 includes Image classification instructions 200 that implement the invention described in the flowchart of FIG. 9, as well as the embodiments of the invention described in the flowcharts of FIG. 12 and 16. Program memory 110 includes instructions for any subroutines needed to implement the invention according to instructions 200; examples of these are also shown in program memory 110. During execution of the instructions, processor 140 may access data memory 114 to obtain or store data necessary for performing image classification. Data memory 114 stores the various intermediate resultant images produced by the various image processing operations performed during image classification, such as image edge location data 60, image characteristic measurement data 70 and numerical interpretation data 90 which represents the score used to perform image classification. Data memory 114 also stores various other miscellaneous data 94.

The actual manner in which the physical components of machine 100 are connected may vary, and may include hardwired physical connections between some or all of the components, as well as connections over wired or wireless communications facilities, such as through remote or local communications networks and infrared and radio connections. Program memory 110 or data memory 114, for example, may include memory that is physically connected to processor 140 as local memory, or that is remotely accessible to processor 140 by means of a wired or wireless communications facility. It is further of importance to note that the range of the physical size of machine 100 may vary considerably from a very large device to smaller desktop, laptop, and pocket-sized or smaller devices. The present invention is operable on all machines in this physical size range.

2. The software product of the present invention.

FIG. 17 also shows software product 120, an article of manufacture that can be used in a machine that includes components like those shown for machine 100. Software product 120 includes data storage medium 130 that can be accessed by storage medium access device 150. Data storage medium 130 could, for example, be a magnetic medium such as a set of one or more floppy disks, an optical medium such as a set of one or more CD-ROMS, or any other appropriate medium for storing data. Data storage medium 130 stores instruction data 134, 138, 144 and 148 that storage medium access device 150 can provide to processor 140. The stored data include data indicating image edge extraction instructions 134; when these instructions are provided to processor 140, and processor 140 executes them, the machine is operated to perform the operations for extracting the image edge locations, as represented in box 210 in FIG. 9 for determining the image edge locations in input image 50; if software product 120 implements one of the illustrated embodiments of FIGS. 12 or 16, then image edge extraction instructions 134 perform the operations for extracting the 8-connected components of the vertical edges in boxes 310, 320 and 330 of FIG. 12 or the operations for extracting the vertical run lengths in boxes 410 and 430 in FIG. 16.

The stored data also include data indicating image characteristic measurement instructions 138; when these instructions are provided to processor 140, and processor 140 executes them, the machine is operated to perform the operations for measuring an image characteristic using the extracted image edge locations represented in box 220 in FIG. 9; if software product 120 implements one of the illustrated embodiments of FIGS. 12 or 16, then image characteristic measurement instructions 138 perform the operations for measuring the height of the 8-connected components of the vertical edges, in box 340 of FIG. 12 or the operations for identifying the length of the vertical runs in box 440 in FIG. 16.

The stored data also include data indicating measurement distribution production instructions 144; when these instructions are provided to processor 140, and processor 140 executes them, the machine is operated to perform the operations for producing image characteristic distribution data using the measurements of the image edge locations, as represented in box 230 in FIG. 9; if software product 120 implements one of the illustrated embodiments of FIGS. 12 or 16, then measurement distribution production instructions 144 perform the operations for counting the number of 8-connected components by height, in box 340 of FIG. 12 or the operations for counting the pixels in the vertical run lengths in box 440 in FIG. 16.

Finally, the stored data include data indicating image classification instructions 148; when these instructions are provided to processor 140, and processor 140 executes them, the machine is operated to perform the operations for producing the statistical interpretation data using the measurement distribution data and for classifying the image using the statistical interpretation data, as represented in box 240 in FIG. 9; if software product 120 implements one of the illustrated embodiments of FIGS. 12 or 16, then image classification instructions 148 perform the operations for producing $score_{400}$ and comparing the score to a threshold, in box 360 of FIG. 12, or the operations for producing $score_{16}$ and comparing the score to a threshold, in box 460 in FIG. 16.

Stored instruction data 134, 138, 144 and 148 are capable of activating and controlling the action of a machine configured as shown for machine 100 in the very specific manner described above with respect to the processes referenced in FIGS. 9, 12 and 16. The article of manufacture, therefore, in its intended environment of use, i.e., a machine with a processor, controls the operation of the machine, and produces physical results when sensed by the processor. The processor responds to what is sensed and performs the acts directed by the stored instruction data.

E. Additional Considerations

1. Experimental data supporting selected scoring techniques as accurate measurements of the image characteristic.

The general approach to the image classification method and the scoring techniques described in the two illustrated embodiments were developed experimentally using sets of test images. The set of text images used to develop the image classification method included three sets of twenty (20) images, where each set included, for each image, a printed copy of an original image, the original image scanned in standard fax mode and then printed, and the original image scanned in fine fax mode and then printed; each printed copy was then scanned at 400 dpi for use as input to the present invention. An additional set of six (6) pairs of images were also used; these six pairs of images included, for each image, a printed copy of an original image scanned at 300 dpi for input to the present invention, and the original image scanned in standard fax mode, printed and then scanned at 400 dpi for input to the present invention. Thus, for classification of standard fax images, 26 pairs of original/standard fax images were used in experiments, and for classification of fine fax images, 20 pairs of original/fine fax images were used. In addition, in order to evaluate the effectiveness of the image classification technique on input images that have been scanned at the lower resolution of 300 dpi, the text images provided at 400 dpi were scaled by a factor of 0.75 in each direction to produce scanned 300 dpi images, and the classification method was then tested using the scaled input images.

Figure 18:
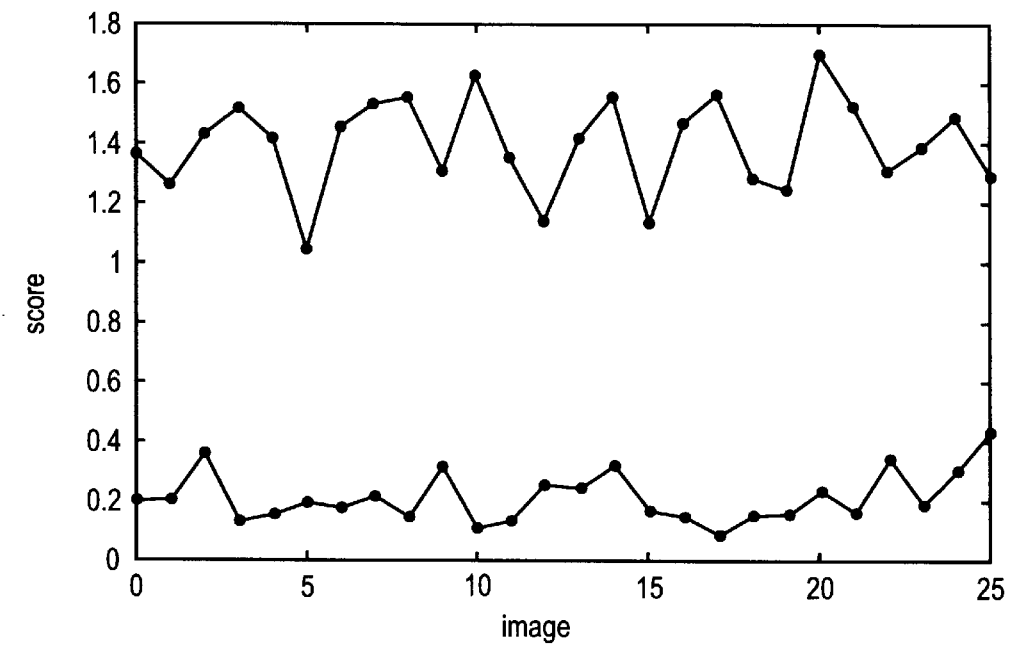
FIG. 18 shows experimental scores computed for the 26 pairs of original and standard fax images, using measurements of 8-connected components according to the image classification method illustrated in FIG. 12, and using statistics developed for selected subimages.

Developing a statistical interpretation of the measurement distribution data that will provide the most accurate classification involves viewing the measurement distribution data in its histogram form (e.g., as in FIGS. 10 and 11 above) and experimentally developing a formula that produces a numerical result that effectively discriminates between the two types of images. FIG. 18 shows scores computed using $score_{400}$ of Equation (1) for the 26 pairs of original and standard fax images, using measurements of 8-connected components according to image classification method 300 illustrated in FIG. 12, and using statistics developed for selected subimages produced by tiling with N=3. The upper set of scores is for the fax images. It can be seen that a threshold score of 0.7 cleanly separates the two sets of images. FIG. 18 shows that the typical ratio of scores between the score for the fax image and the score for the same original image is about 10:1. For images with only text, it was experimentally shown that the ratio is typically larger than 10:1, and for images with only graphics, the ratio is smaller. The set of 26 images contains much graphics, and some of the selected tiles are necessarily graphics rather than text; the results shown in FIG. 18 demonstrate that the illustrated embodiment of the image classification method shown in FIG. 12 performed satisfactorily on all of the images.

Figure 19:
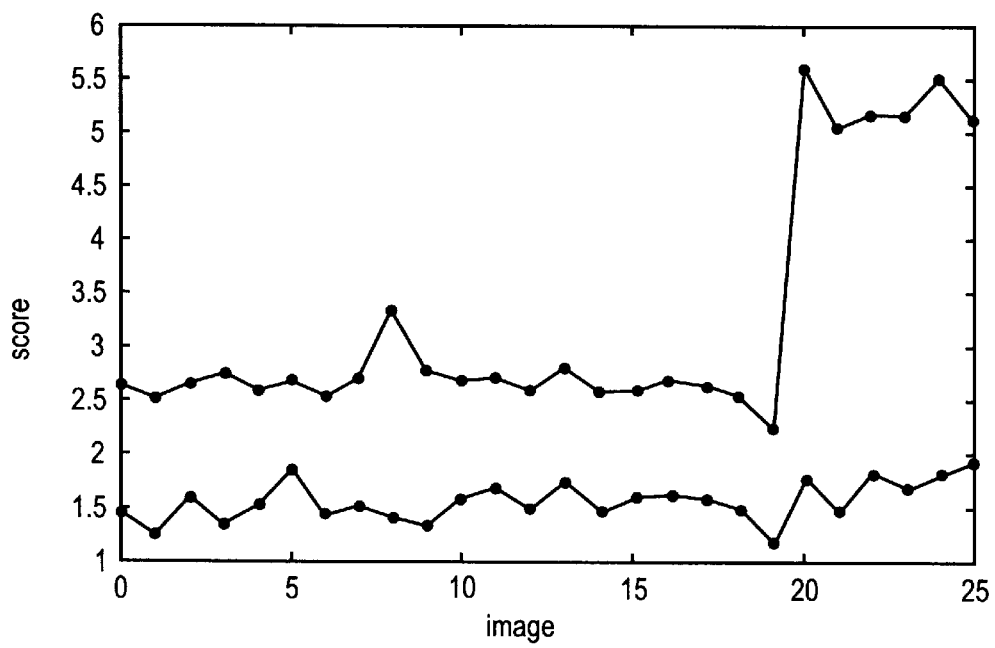
FIG. 19 shows experimental scores computed for the 26 pairs of original and standard fax images, using measurements of the vertical run lengths according to the image classification method illustrated in FIG. 16, and using statistics developed for the entire images.

FIG. 19 shows scores computed using $score_{16}$ of Equation (2) for the 26 pairs of original and standard fax images, using measurements of the vertical run lengths according to image classification method 400 illustrated in FIG. 16, and using statistics developed for the entire images (N=1). The upper set of scores in FIG. 19 also shows results for the fax images, while the lower set shows the results for the original images. While the respective sets of scores are not as clearly distinguishing as those of FIG. 18, a threshold score is discernible in the experimental data. Scores for the same 26 pairs of images produced using a selected subimage with N=3 (not shown) show that image classification accuracy using $score_{16}$ is not noticeably degraded using the subimage.

It was initially thought that differences in the measurement distribution data between input images scanned at different resolutions (e.g., between those scanned at 300 dpi versus those scanned at 400 dpi) would also be a factor in deciding upon a satisfactory statistical interpretation. However, $score_{400}$ of Equation (1) was shown experimentally to provide an effective and accurate discriminating interpretation of the measurement distribution data for input images scanned at either 300 dpi or 400 dpi, with respect to discriminating between original and standard fax images.

The score functions given above are simple linear combinations of distributions of a selected, measured image characteristic, normalized to the shortest measurement. The score functions are not weighted, except for a negative sign in $score_{400}$. No optimization was performed for combining these features into a feature vector that best distinguishes the different classes.

2. Application of the scores to image classification of images previously scanned or printed at "fine fax" resolution.

Figure 20:
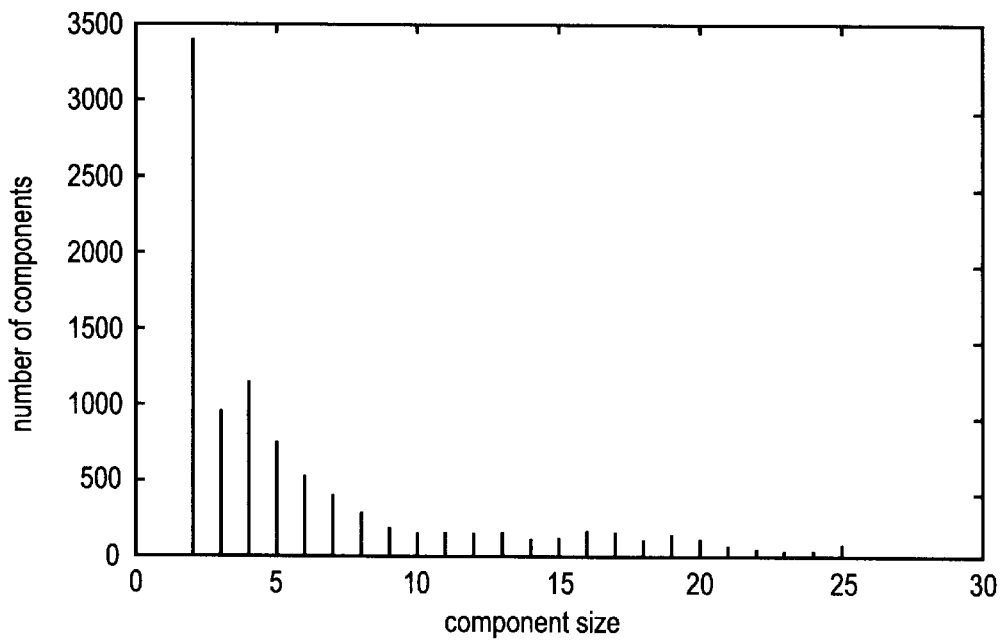
FIG. 20 is a histogram of the number of components that are found for each measured component height of the 8-connected components extracted from a fine fax image re-scanned at 400 dpi for input into the embodiment of FIG. 12 of the present invention.

While the illustrated embodiments of FIGS. 12 and 16 above were described as applied to distinguishing between original images and fax images that had been previously scanned in standard fax mode, the present invention is also intended to encompass variations of the technique that discriminate between original images and fax images that have been previously scanned in fine fax mode, where the scanning resolution is 200×200 dpi. However, experimental data produced using the 20 pairs of test images that included fine fax images showed that neither scoring function (neither $score_{16}$ nor $score_{400}$) was entirely satisfactory for accurately differentiating between original and fine fax images. The reason for this can perhaps be seen in the histogram of FIG. 20, which shows a histogram for the height of 8-connected edge components for fine fax images, when scanned at 400 dpi. The measurement data shown is for the same image shown in FIGS. 10 and 11. It can be seen, in comparing the distribution of the heights of 8-connected edge components in FIG. 20 with the distributions in FIGS. 10 and 11 that the differences between the fine fax and original images are not as dramatic as the differences between the standard fax and original images. The sharp peaks separated by 4 pixels are absent in the histogram of FIG. 20, and the weight of the $y_n$ values for n>2 is much smaller than for the standard fax. However, the differences that are shown are sufficiently significant to be used for discrimination purposes.

A scoring function developed for image classification of input images scanned at 300 dpi proved to be useful for differentiating between fine fax and original images. That scoring function, called $score_{300}$, is shown in Equation 3:

$$score_{300}=(y_3+y_4+y_5+y_6+y_7+y_8+y_9)/i\ y_2 \qquad (3)$$

Figure 21:
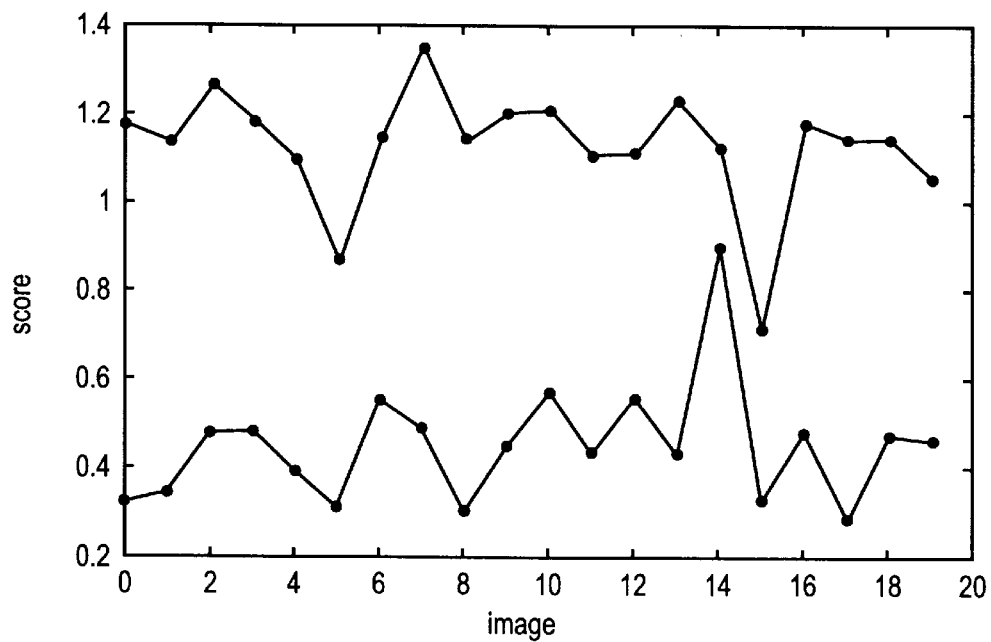
FIG. 21 shows experimental scores for 20 pairs of original and fine fax test images, using the image classification method illustrated in FIG. 12, and using selected subimages.

FIG. 21 shows the results of using $score_{300}$ to discriminate between the 20 pairs of test fine fax and original images. FIG. 21 shows scores for the 20 pairs of original and fine fax images, using the image classification method illustrated in FIG. 12, and using selected subimages produced by tiling with N=3. When a threshold at 0.7 is chosen, only two of the images are classified in error. Neither of these images included substantial amounts of text; both images 15 and 16 were images of maps. Note that the original of Image 15 was misclassified using $score_{300}$, but it was properly classified using $score_{400}$. The data in FIG. 21 suggests that there is some accuracy improvement that is likely to be gained by optimizing the coefficients of $score_{300}$.

3. Background vertical image edge pixels.

Both illustrated embodiments of the invention are described with respect to extracting the foreground (e.g., what are referred to as the ON or black) vertical image edge locations of the input image and measuring an image characteristic of those foreground locations. However, the present invention may also be effectively implemented using the background (e.g., what may be referred to as the OFF or white) vertical image edge locations of the input image. Persons of skill in the image processing arts will appreciate that a relatively straightforward modification made to the flowcharts in FIG. 12 and 16 is all that is needed; specifically, replacing the morphological erosion operation of box 310 with a dilation operation using the same structuring element 314, followed by the XOR operation of box 320 will produce a resultant image that contains only the background vertical image edge locations.

4. Effects of edge noise.

The image classification method as shown in the illustrated embodiments examines the structure of the image edges, which have been scanned at high resolution. Typically in such image processing operations, edge noise is anticipated to be a significant factor. For example, single black pixels protruding from an edge or single white pixels within an edge may significantly change the statistics and reduce the accuracy of a scoring mechanism. Higher-order edge pixel noise (e.g., due to two or more adjacent pixels) may also occur occasionally. A conventional edge cleaning operation is the typical solution for such problems. However, the experimental data showed that edge cleaning operations applied to input image 50 in the first illustrated embodiment (FIG. 12) had no effect on the image classification results. Moreover, the experimental data showed that edge cleaning operations applied in the second illustrated embodiment (FIG. 16) increased the variability of the results, making the method significantly worse. Thus, edge cleaning operations applied to input image 50 prior to image classification are unnecessary and not recommended.

5. Other image characteristics.

Image characteristics measured in relation to curvilinear image edge locations other than those described in the illustrated embodiments may also produce data that may be used to accurately classify an input image. For example, an image characteristic that apply curve fitting to the curvilinear image edge locations of the symbols in the image would approximate the curvilinear image edge locations by curved line segments; deviations of the curvilinear image edge locations from the curved line segments could then be measured; the fax images would be expected to have larger deviations. Such a curve fitting technique would likely require computation of data structures that are somewhat removed from the image, and may be less efficient that the techniques shown in the illustrated embodiment.

It can be seen from the foregoing discussion that the image classification method and software product of the present invention efficiently and accurately discriminate between input images that have been previously scanned or printed at low resolution at some point in their history and images that are referred to herein as original images—those that have not been previously scanned or printed at low resolution. The input images need not be exclusively text documents, but should contain at least some symbols, such as glyphs, or graphical objects that have curvilinear image edge locations; thus the invention successfully classifies images that contain text in languages in addition to English that include characters with rounded edges. In addition, the classification process works successfully using only a small portion of an image that may be automatically selected from the scanned input image; this results in both reducing the computation time and improving the accuracy for documents that contain both text and stippled image regions such as photographic images.

While this invention has been described in conjunction with at least two specific embodiments thereof, the description was not intended to limit the invention to the embodiments illustrated. It is evident that many alternatives, modifications and variations will be apparent to those skilled in the art. Accordingly, the invention as herein described is intended to embrace all such alternatives, modifications and variations that fall within the scope of the appended claims.

What is claimed:

1. An image processing method, implemented in a machine having a processor, for operating on image data defining an image including a first plurality of image locations; the image having an image characteristic capable of being measured in relation to image locations occurring at image edges; the method classifying an image on the basis of a measurement of the image characteristic for the image, and comprising the steps of:

producing a second plurality of image locations, referred to as image edge locations, indicating the image edge locations occurring in the first plurality of image locations at one of vertical or horizontal edges included in the image; said producing step determining a plurality of 8-connected components of vertical edges included in the image;

performing a measurement operation using the image to measure an image characteristic of the image in relation to the image edge locations; the image characteristic being a measurable attribute of the image; the measurement operation producing image characteristic measurement data by performing the steps of:

measuring a height for each of the plurality of 8-connected components of vertical edges, and producing count data indicating a count of a number of 8-connected components of vertical edges for each height measurement;

producing distribution data indicating a distribution of the image characteristic measurement data; and classifying the image as being either an original image or a fax image on the basis of interpretation data indicating a numerical interpretation of the distribution data.

2. The method according to claim 1 wherein the interpretation data used to classify the image is computed using a function of the count data.

3. The method according to claim 1 wherein the image data defining an image including a first plurality of image locations defines an entire input image; wherein the method further includes, prior to producing the image edge locations, determining a selected subimage of the entire image; the step of producing the image edge locations including producing the image edge locations in the selected subimage.

4. The method according to claim 1 wherein the image edge locations include image locations indicating expected curvilinear image edge locations of glyphs and graphical objects included in the image;

the image characteristic measurement data includes measurements of the image characteristic related to the image edge locations indicating the expected curvilinear image edge locations of glyphs and graphical objects included in the image; and the interpretation data provides a statistical interpretation of the extent of curvature of the expected curvilinear image edge locations of glyphs and graphical objects included in the image.

5. An image processing method, implemented in a machine having a processor, for operating on image data defining an image including a first plurality of image locations; the method classifying the image, and comprising the steps of:

determining a second plurality of image locations, referred to as image edge locations, indicating the image edge locations occurring in the first plurality of image locations at one of vertical or horizontal edges included in the image;

determining a third plurality of image locations indicating connected components of vertical edges included in the image edge locations;

determining sizes of each of the connected components of vertical edges using the third plurality of image locations; wherein the size of each connected component of vertical edges is a height of image locations included in the connected component of vertical edges;

producing a data array, referred to as histogram data, indicating frequency of occurrence of the plurality of connected components of vertical edges as a function of size thereof;

producing a numerical score using the histogram data; wherein producing the numerical score includes combining the frequency of occurrence of the plurality of connected components of vertical edges at two or more sizes; and classifying the image on the basis of the numerical score as being either an original image or a fax image.

6. The method according to claim 5 wherein the image includes a plurality of glyphs; and wherein the image edge locations occurring in the first plurality of image locations are image edge locations of the glyphs.

7. The method according to claim 5 wherein the step of determining the image edge locations includes performing a morphological image operation using the first plurality of image locations followed by an XOR operation; the morphological image operation and the XOR operation producing a resultant image from which the image edge locations may be identified.

8. The method according to claim 5 wherein the size of each connected component of vertical edges is a count of image locations included in each connected component of vertical edges.

9. The method according to claim 5 wherein combining the frequency of occurrence of the plurality of connected components of vertical edges at two or more sizes includes producing a sum of each frequency of occurrence of the plurality of connected components of vertical edges at the two or more sizes; and dividing the sum by an expected largest frequency of occurrence of the connected components of vertical edges.

10. The method according to claim 5 wherein the connected components of vertical edges are 4-connected components.

11. The method according to claim 10 wherein the numerical score is computed according to the equation:

$$score_{16} = (y_2+y_3+y_4+y_5+y_6+y_7+y_8+y_9)/y_1$$

wherein y represents a count of image locations in vertical runs of image locations in the image, and an index of y represents a value of a vertical run length.

12. The method according to claim 5 wherein the connected components of vertical edges are 8-connected components of vertical edges included in the image.

13. The method according to claim 12 wherein the numerical score is computed according to the equation $$score_{400} = (-y_3+y_4+y_5+y_6+y_7+y_8+y_9)/y_2$$

wherein y represents a count of 8-connected components, and an index of y represents a value of an 8-connected component height.

14. The method according to claim 5 wherein each image location is a pixel.

15. The method according to claim 5 wherein each image edge location is a foreground image edge location.

16. The method according to claim 5 wherein each image edge location is a background image edge location.

17. The method according to claim 5 wherein the image data defining an image including a first plurality of image locations defines an entire input image; wherein the method further includes, prior to determining the image edge locations, determining a selected subimage of the entire image; the step of determining the image edge locations including determining the image edge locations in the selected subimage.

18. The method according to claim 17 wherein determining a selected subimage of the entire input image includes producing a reduced image of the entire input image;

dividing the reduced image into a plurality of tiles, wherein a tile is a portion of the reduced image;

counting the foreground image locations in each of the tiles to produce a count for each tile;

selecting the tile having the largest count of foreground pixels; and using the selected tile to identify a subimage portion of the input image as the selected subimage.

19. An article of manufacture for use in a machine that includes a memory device for storing data; a storage medium access device for accessing a medium that stores data; and a processor connected for accessing the data stored in the memory device and for receiving data from the storage medium access device; the data stored in the memory device including an input image including a first plurality of image locations; the article comprising:

a data storage medium that can be accessed by the storage medium access device when the article is used in the machine; and data stored in the data storage medium so that the storage medium access device can provide the stored data to the processor when the article is used in the machine; the stored data comprising instruction data indicating instructions the processor can execute;

the processor, in executing the instructions, performing the steps of:

producing a second plurality of image locations, referred to as image edge locations, indicating the image edge locations occurring in the first plurality of image locations at one of vertical or horizontal edges included in the input image; said producing step determining a plurality of 8-connected components of vertical edges included in the image;

performing a measurement operation using the input image to measure an image characteristic of the input image in relation to the image edge locations; the image characteristic being a measurable attribute of the input image; the measurement operation producing image characteristic measurement data by performing the steps of:

measuring a height of each of the plurality of 8-connected components of the vertical edges, and producing count data indicating a count of a number of 8-connected components for each height;

producing distribution data indicating a distribution of the image characteristic measurement data; and classifying the input image as being either an original image or a fax image on the basis of interpretation data indicating a numerical interpretation of the distribution data.

20. The article of manufacture of claim 19 wherein the image edge locations produced by the processor in executing the instructions include image locations indicating expected curvilinear image edge locations of glyphs and graphical objects included in the input image;

the image characteristic measurement data produced by the processor performing the measurement operation includes measurements of the image characteristic related to the image edge locations indicating the expected curvilinear image edge locations of glyphs and graphical objects included in the input image; and the interpretation data used by the processor in executing the instructions to classify the image provides a statistical interpretation of the extent of curvature of the expected curvilinear image edge locations of glyphs and graphical objects included in the input image.

* * * * *